(12) United States Patent
Moore, Jr. et al.

(10) Patent No.: US 9,260,854 B1
(45) Date of Patent: Feb. 16, 2016

(54) METHOD FOR INTERNALLY SUPPORTING A SEPTIC TANK AND AN INTERNAL SUPPORT ARTICLE FOR A SEPTIC TANK

(71) Applicant: Infiltrator Systems, Inc., Old Saybrook, CT (US)

(72) Inventors: Roy E. Moore, Jr., Killingworth, CT (US); Paul R. Holbrook, Old Saybrook, CT (US)

(73) Assignee: Infiltrator Systems, Inc., Old Saybrook, CT (US)

( * ) Notice: Subject to any disclaimer, the term of this patent is extended or adjusted under 35 U.S.C. 154(b) by 130 days.

(21) Appl. No.: 13/932,624

(22) Filed: Jul. 1, 2013

Related U.S. Application Data

(60) Provisional application No. 61/666,496, filed on Jun. 29, 2012.

(51) Int. Cl.
| | |
|---|---|
| *B65D 88/76* | (2006.01) |
| *E03F 5/10* | (2006.01) |
| *B65D 45/16* | (2006.01) |
| *B65D 8/00* | (2006.01) |

(52) U.S. Cl.
CPC . *E03F 5/10* (2013.01); *B65D 45/16* (2013.01); *B65D 11/02* (2013.01); *B65D 88/76* (2013.01)

(58) Field of Classification Search
CPC ........ B65D 11/02; B65D 45/16; B65D 88/06; B65D 88/76; B65D 90/28
USPC ............ 220/4.24, 4.25, 563, 567.1, 651, 652, 220/653, 654; 210/532.2
See application file for complete search history.

(56) References Cited

U.S. PATENT DOCUMENTS

| | | | |
|---|---|---|---|
| 4,040,372 A | 8/1977 | Flanders | |
| 4,325,823 A | 4/1982 | Graham | |
| 4,955,495 A * | 9/1990 | Ruebesam | .................... 220/545 |
| 5,361,930 A | 11/1994 | Perry | |
| 5,878,907 A | 3/1999 | Graf | |
| 6,280,614 B1 | 8/2001 | Berg et al. | |
| 6,558,535 B2 | 5/2003 | Berg et al. | |
| 7,572,372 B2 | 8/2009 | Graf | |
| 7,854,338 B2 | 12/2010 | Graf | |
| 2010/0270220 A1 * | 10/2010 | Juhere | ...................... 210/170.08 |

* cited by examiner

*Primary Examiner* — Fenn Mathew
*Assistant Examiner* — Madison L Poos
(74) *Attorney, Agent, or Firm* — Steven M. McHugh

(57) ABSTRACT

A septic tank is provided and includes a tank top, a tank bottom and a tank side wall which define a tank interior. The septic tank further includes a top channel structure that defines a top channel on an interior surface of the tank top, wherein the top channel structure includes a top channel latch that defines a top brace pocket and a bottom channel structure that defines a bottom channel on an interior surface of the tank bottom, wherein the bottom channel structure includes a bottom channel latch that defines a bottom brace pocket. The septic tank includes a supporting brace having a first brace end and a second brace end, wherein the first brace end is configured to be located within the top brace pocket and the second brace end is configured to be located within the bottom brace pocket.

20 Claims, 27 Drawing Sheets

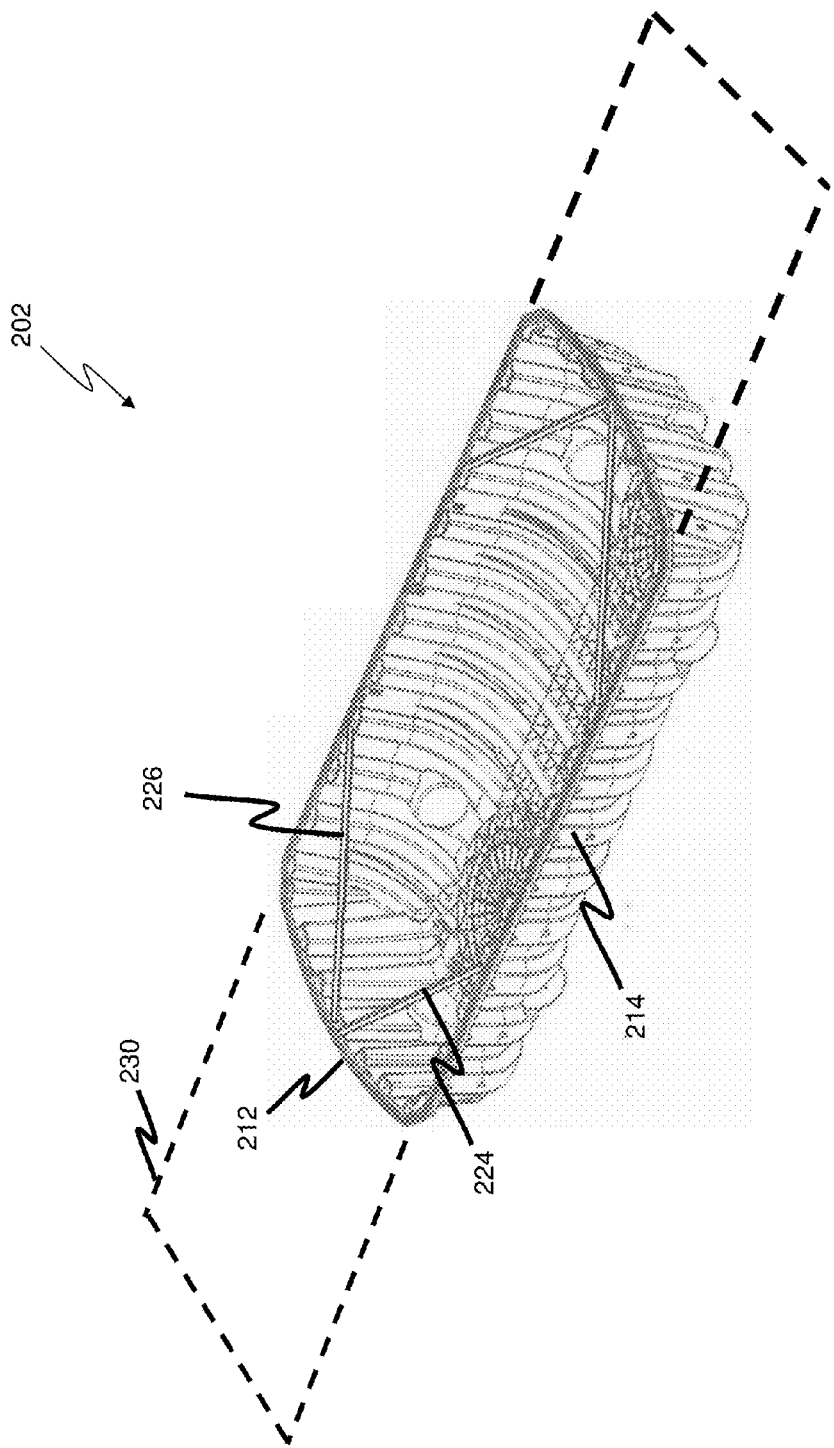

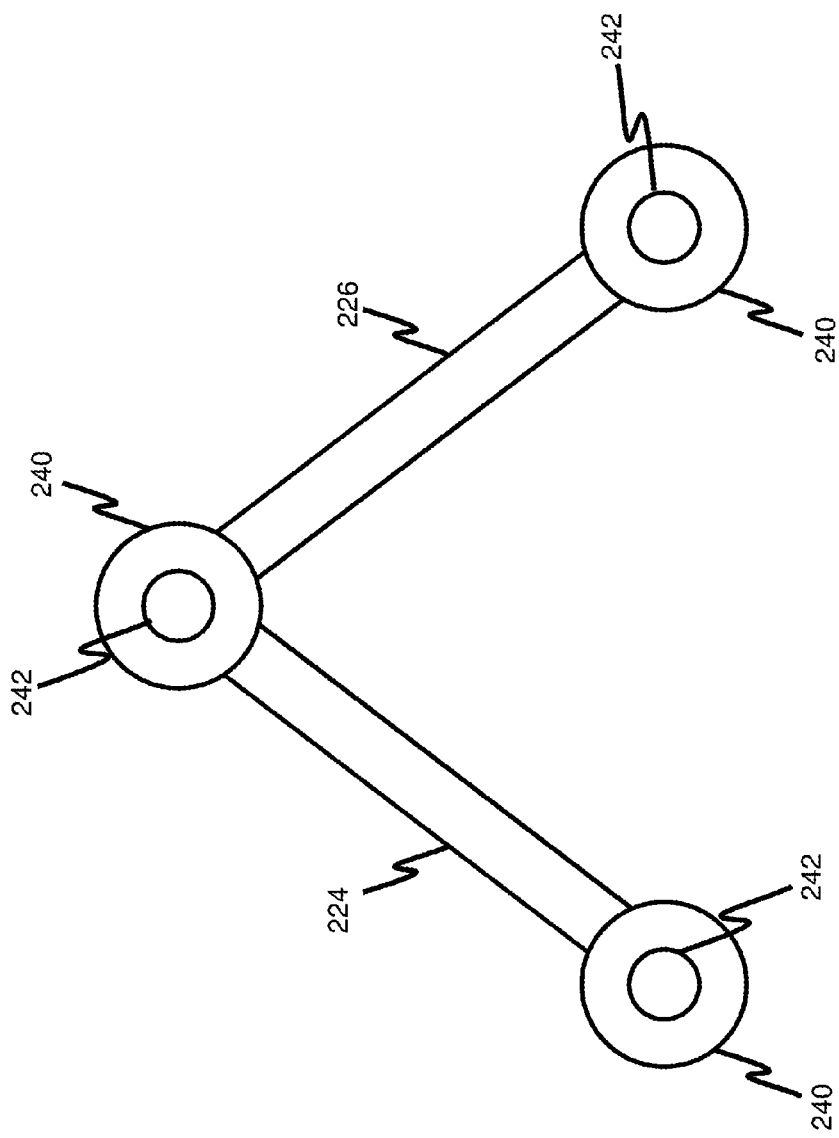

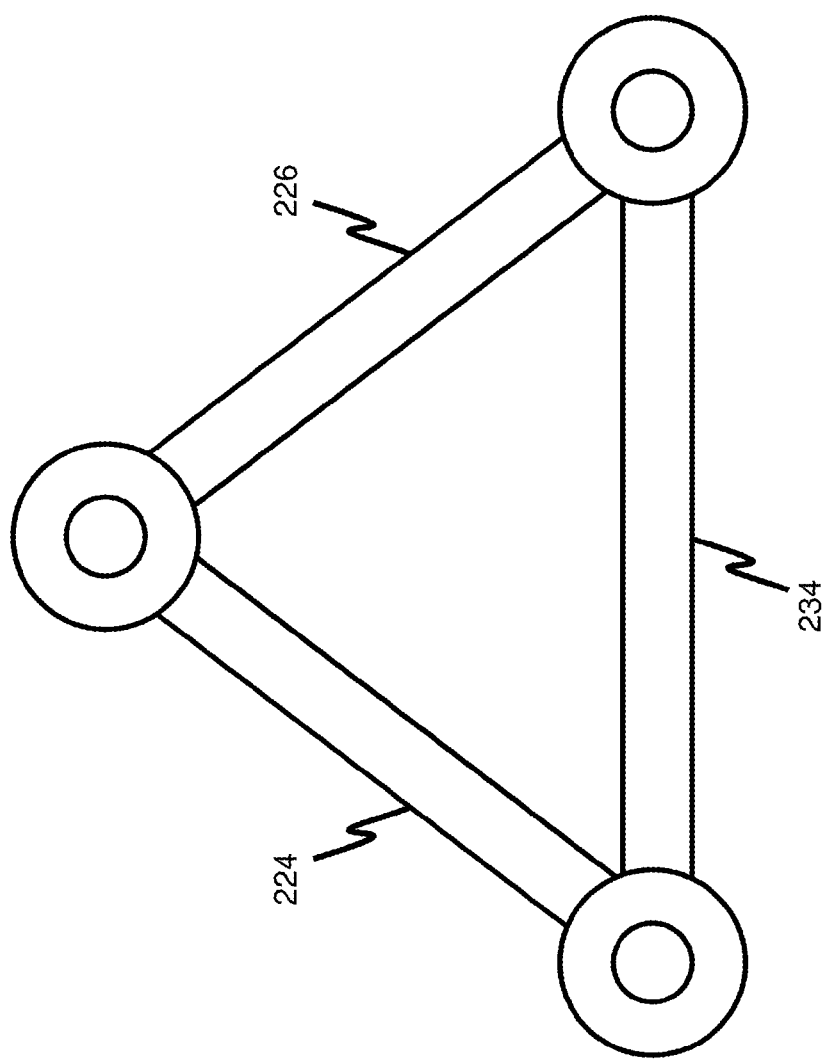

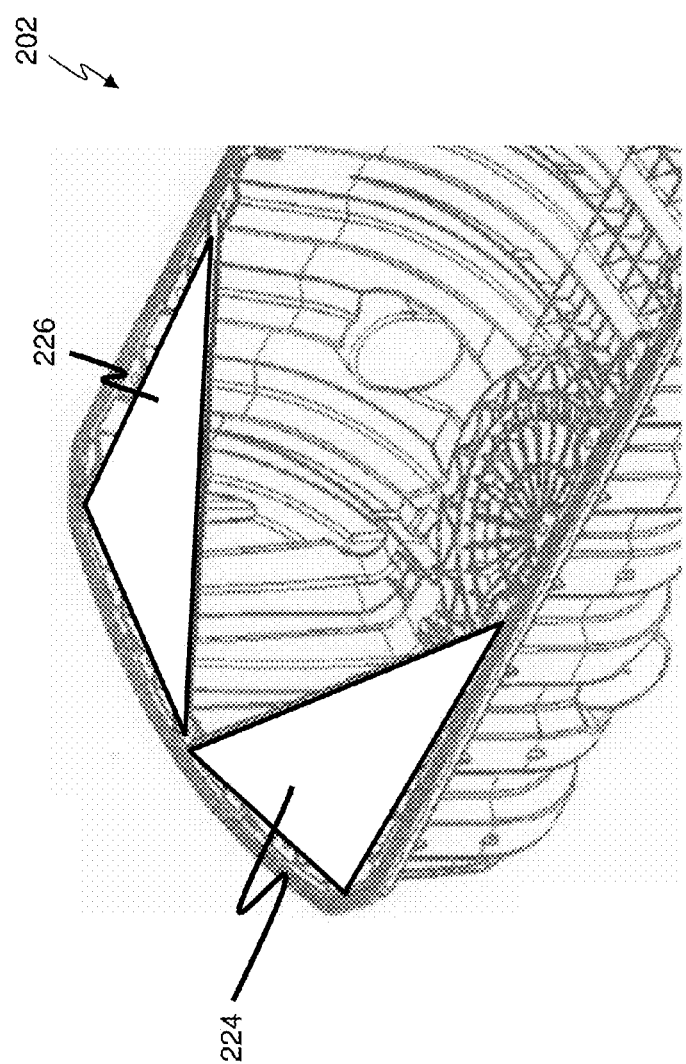

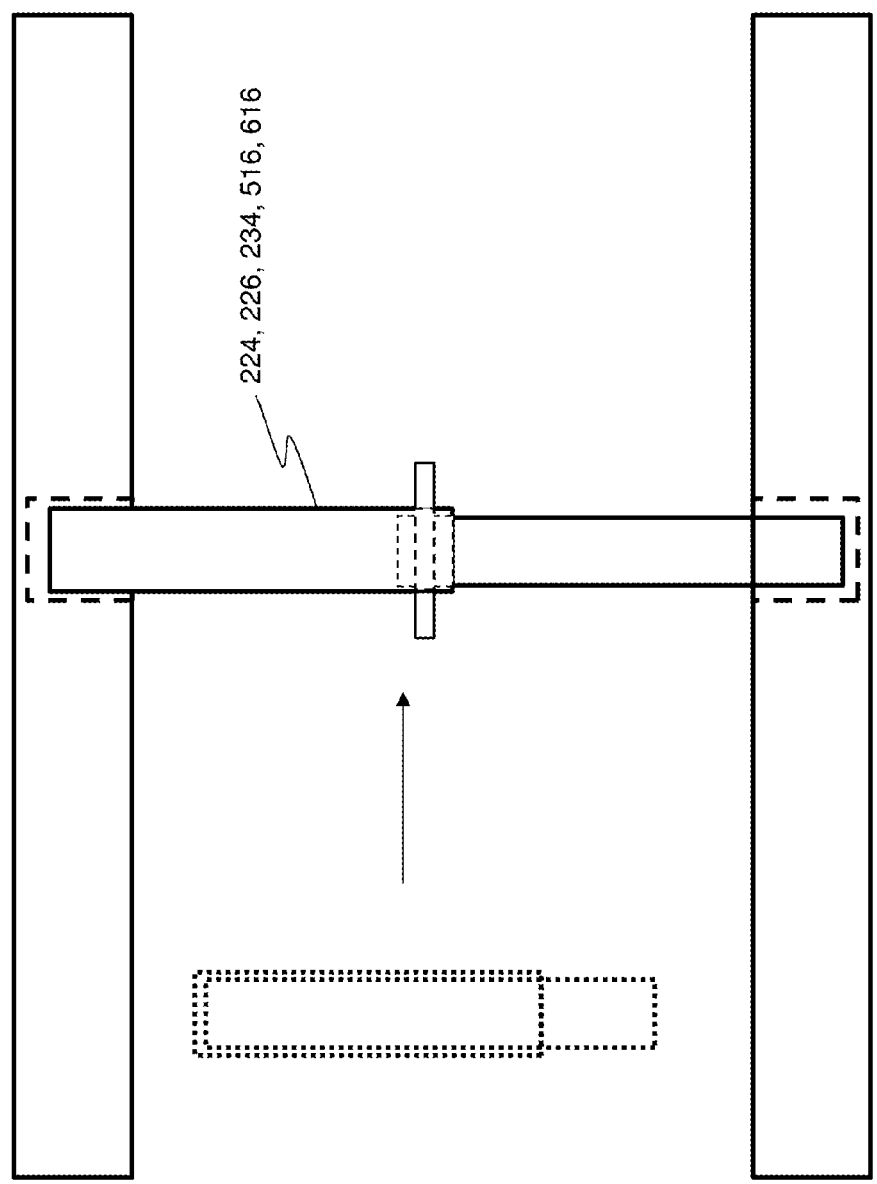

METHOD FOR INTERNALLY SUPPORTING A SEPTIC TANK AND AN INTERNAL SUPPORT ARTICLE FOR A SEPTIC TANK

RELATED APPLICATIONS

This application claims priority to and benefit of the filing date of U.S. Provisional Patent Application Ser. No. 61/666,496, filed Jun. 29, 2012, the contents of which are incorporated by reference herein in its entirety.

FIELD OF THE INVENTION

The present invention relates generally to tanks for containing liquids and more particularly to a septic tank for containing waste water having an internal strut/brace for increased structural integrity.

BACKGROUND OF THE INVENTION

Molded plastic septic tanks for holding and processing wastewater are well known and have been used in place of traditional concrete septic tanks. These plastic septic tanks, which may be made by blow molding or rotational molding, generally have a cylindrical shape and may have a rectangular or round cross section. Typically, these plastic septic tanks are made of polyethylene and have thicknesses that range from one-quarter to three-eighths of an inch. Additionally, they often include heavily ribbed or corrugated sections for increased strength to resist the unique forces applied to the tank structure when buried in soil. The volume capacity for a typical domestic septic system is in the range of 1000-1500 gallons and septic tanks must have access ports with closures, to permit maintenance. Moreover, most septic tanks have at least one baffle to limit the lengthwise flow within the tank and to divide the tank into an input end portion and an output end portion. Furthermore, because septic tanks are buried beneath soil, they must also resist the weight of overlying soils and possible vehicles or other weighted objects that may be placed on the soil surface in proximity to the tank.

It should be appreciated that molded plastic septic tanks include some advantages to concrete tanks, such as light weight construction, better resistance to impact damage and corrosion, and improved resistance to thermal damage in the event of freezing. Unfortunately however, molded plastic septic tanks also include some disadvantages, such as being lightweight (which makes them buoyant) and as such, the tanks tend to rise out of the soil under which they are buried. Moreover, another disadvantage involves the limited structural rigidity of the tank as a result of its lightweight construction. This limited structural rigidity can result in distortion during installation and use. In the past few years, some state regulatory agencies have required that septic tanks pass certain tests which measure the propensity of the tank to distort during installation or use. In one kind of test, a two-piece septic tank is subjected to a partial vacuum, e.g., a pressure of about 5.8 inches of Hg less than standard atmospheric pressure, which tends to pull the walls of the tank inwardly. Such a vacuum is meant to simulate the pressure on an emptied tank when it is buried in soil, particularly in wet or non-cohesive soil.

One way the above issues with prior art plastic septic tanks have been addressed involve including structural corrugations and other features for resisting the foregoing kinds of loads. However, in making these septic tanks, the weight and cost of the plastic materials are a major consideration. Therefore, one design objective may be to maximize the volume to surface area ratio, while another consideration may be to limit the size of excavation which is required to install the tank. One approach may include having oblong cross section tanks, e.g., where the cross section approximates a rectangle or square. Unfortunately however, such shapes can present relatively large, lightly curved or nearly flat surfaces. Accordingly, septic tanks of such shape will most likely need more strengthening in certain areas than does a nearly circular cross section tank.

Furthermore, septic tanks which have generally circumferential corrugations, with any cross section, can be susceptible to lengthwise contraction when subjected to interior vacuum or to soil forces which apply similar forces. This lengthwise contraction, sometimes referred to as "accordioning", is undesirable, because if the tank shrinks in length when installed, or if it otherwise deforms, the soil in response moves inwardly to occupy the space that was formerly occupied by the uncontracted tank. Thus, there can be an undesirable reduction in the nominal volume of the tank. Another factor which can affect the tank involves heating by the sun or atmosphere prior to installation. This heating can lower the stiffness of the plastic material thereby reducing the structural strength of the tank making it more susceptible to distortion during handling or initial installation. Accordingly, more strengthening may be needed for tanks than would appear from an analysis of the forces which result from being buried in soil.

SUMMARY OF THE INVENTION

A septic tank is provided and includes a tank top section having tank top side walls and tank top end walls which define a tank top cavity, wherein the tank top section includes a tank top opening surrounded by a top opening edge and communicated with the tank top cavity. The septic tank also includes a tank bottom section having tank bottom side walls and tank bottom end walls which define a tank bottom cavity, wherein the tank bottom section includes a tank bottom opening surrounded by a bottom opening edge and communicated with the tank bottom cavity, wherein the top opening edge and bottom opening edge are configured to be connected together to form the septic tank such that the tank top cavity is adjacent to the tank bottom cavity to form the tank interior cavity.

Additionally, the septic tank includes at least one of, at least one end wall pocket located on an interior surface of the tank top end walls and tank bottom end walls, at least one side wall pocket located on an interior surface of the tank top side walls and tank bottom side walls and at least one internal support, wherein the internal support includes a first internal support end located within the at least one end wall pocket and a second internal support end located within the at least one side wall pocket. Moreover, the septic tank also includes a top channel structure that defines a top channel on an interior surface of the tank top section, wherein the top channel structure includes a top channel latch that extends into the top channel to define a top brace pocket, a bottom channel structure that defines a bottom channel on an interior surface of the tank bottom section, wherein the bottom channel structure includes a bottom channel latch that extends into the bottom channel to define a bottom brace pocket and a supporting brace having a first brace end and a second brace end, wherein the first brace end is configured to be located within the top brace pocket and the second brace end is configured to be located within the bottom brace pocket.

A septic tank is provided and includes a tank top, a tank bottom, a plurality of tank side walls and a plurality of tank end walls, wherein the tank top, tank bottom, plurality of tank side walls and plurality of tank end walls define a tank interior cavity. The septic tank also includes at least one end wall pocket located on an interior surface of at least one tank end wall, at least one side wall pocket located on an interior surface of at least one tank side wall and at least one supporting member having a first supporting member end located within at least one end wall pocket and a second supporting member end located within at least one side wall pocket. Moreover, the septic tank includes at least one supporting member being strong enough to limit distortion of the tank to a range of about 0.5% to 5% when a vacuum within a range of about 3 to 7 inches of Hg is applied to the tank interior.

A tank is provided and includes a tank top, a tank bottom and a tank side wall, wherein the tank top, tank bottom and tank side wall define a tank interior. Additionally, the tank includes a top channel structure that defines a top channel on an interior surface of the tank top, wherein the top channel structure includes a top channel latch that defines a top brace pocket and a bottom channel structure that defines a bottom channel on an interior surface of the tank bottom, wherein the bottom channel structure includes a bottom channel latch that defines a bottom brace pocket. The tank also includes a supporting brace having a first brace end and a second brace end, wherein the first brace end is configured to be located within the top brace pocket and the second brace end is configured to be located within the bottom brace pocket.

BRIEF DESCRIPTION OF THE DRAWINGS

The foregoing and other features and advantages of the present invention should be more fully understood from the accompanying detailed description of illustrative embodiments taken in conjunction with the following Figures in which like elements are numbered alike in the several Figures:

FIG. 8 is a top-down side isometric view of the tank bottom of FIG. 3.

FIG. 12A is a top down view of first and second internal supports configured as a single construction, in accordance with an additional embodiment of the invention.

FIG. 12C is a top down view of first, second and third internal supports configured as a single construction, in accordance with still yet an additional embodiment of the present invention.

FIG. 13 is a top-down side isometric view of one end of a tank bottom with the first and second internal supports configured as a single construction wedge, in accordance with still yet an additional embodiment of the present invention.

FIG. 20B is a side view of the expandable/retractable internal support/brace of FIG. 20A in the expanded configuration.

DETAILED DESCRIPTION

Figure 1:
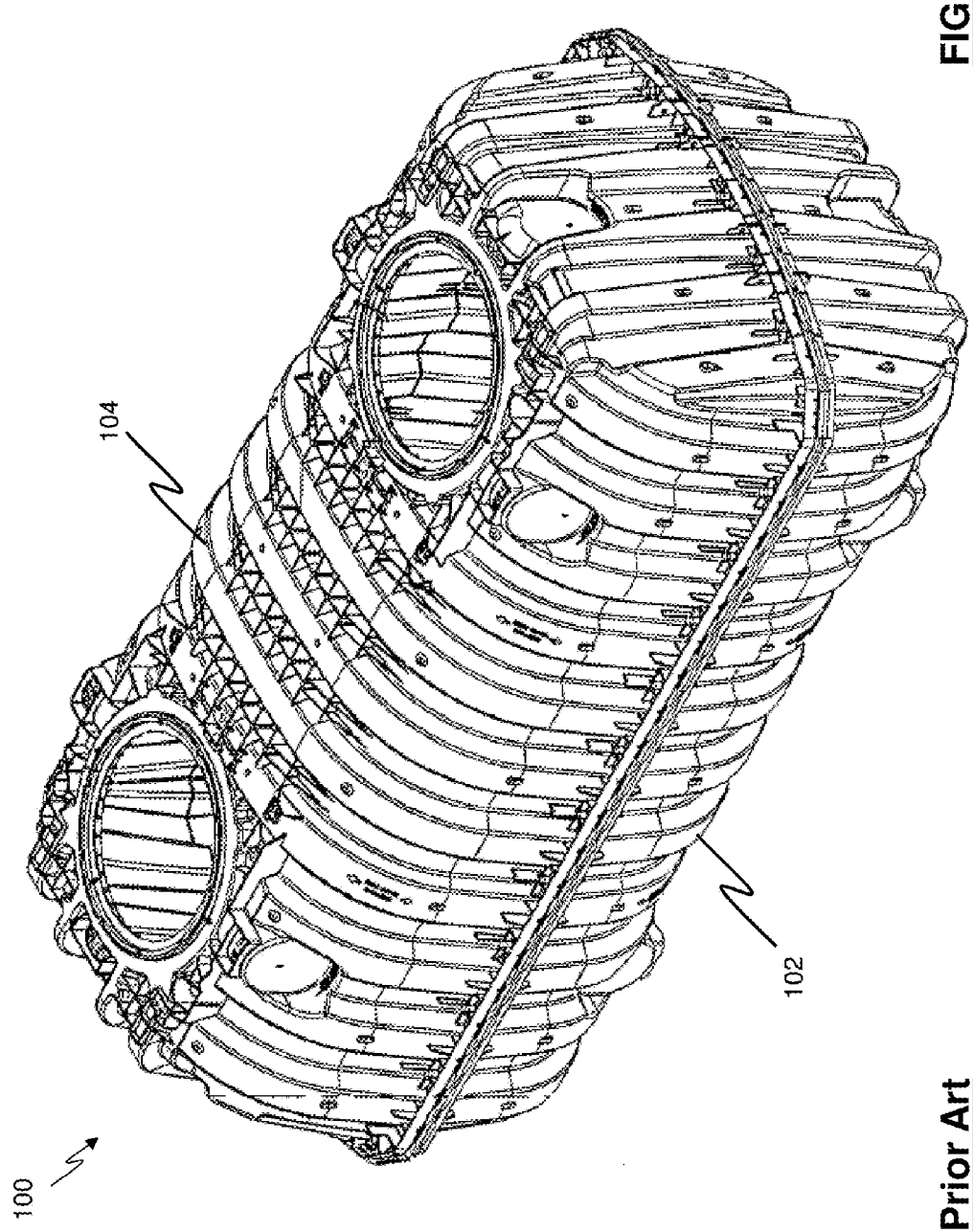
FIG. 1 top-down side isometric view of a fully assembled two piece septic tank having a tank bottom and a tank top.
Figure 2A:
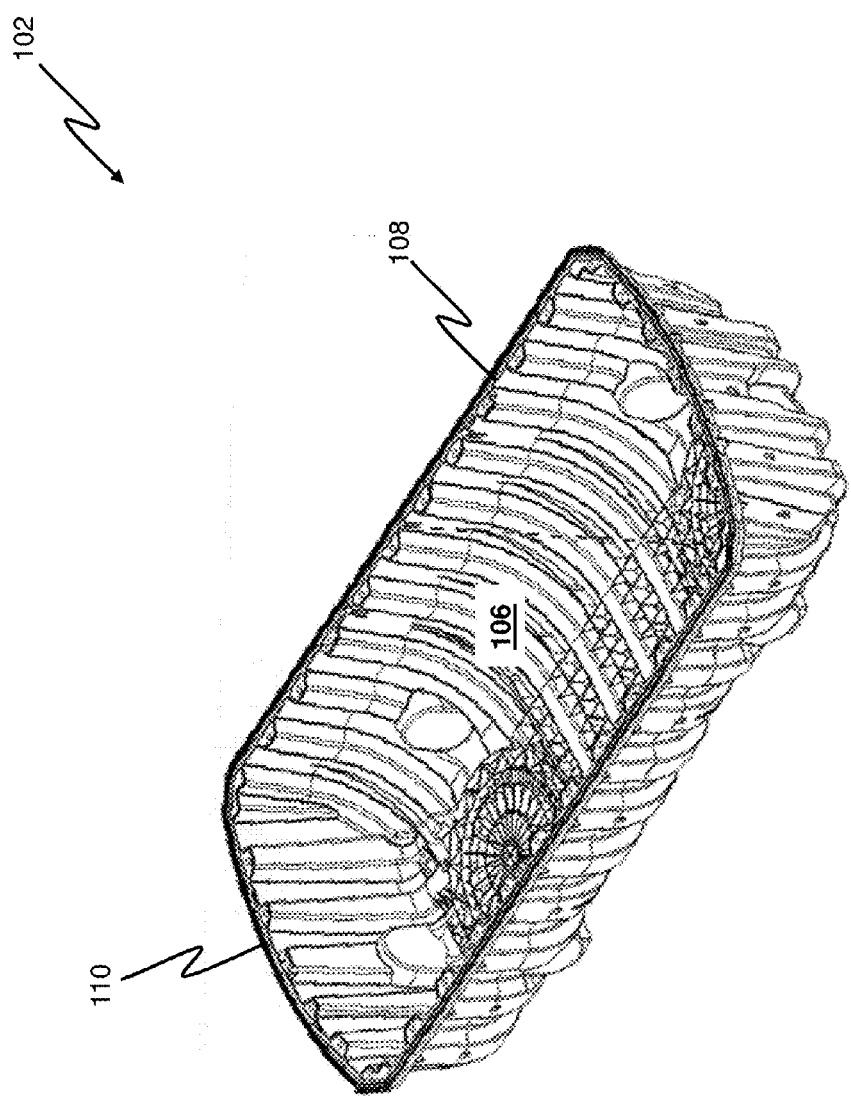
FIG. 2A is a top-down side isometric view of a tank bottom of the fully assembled septic tank of FIG. 1.
Figure 2B:
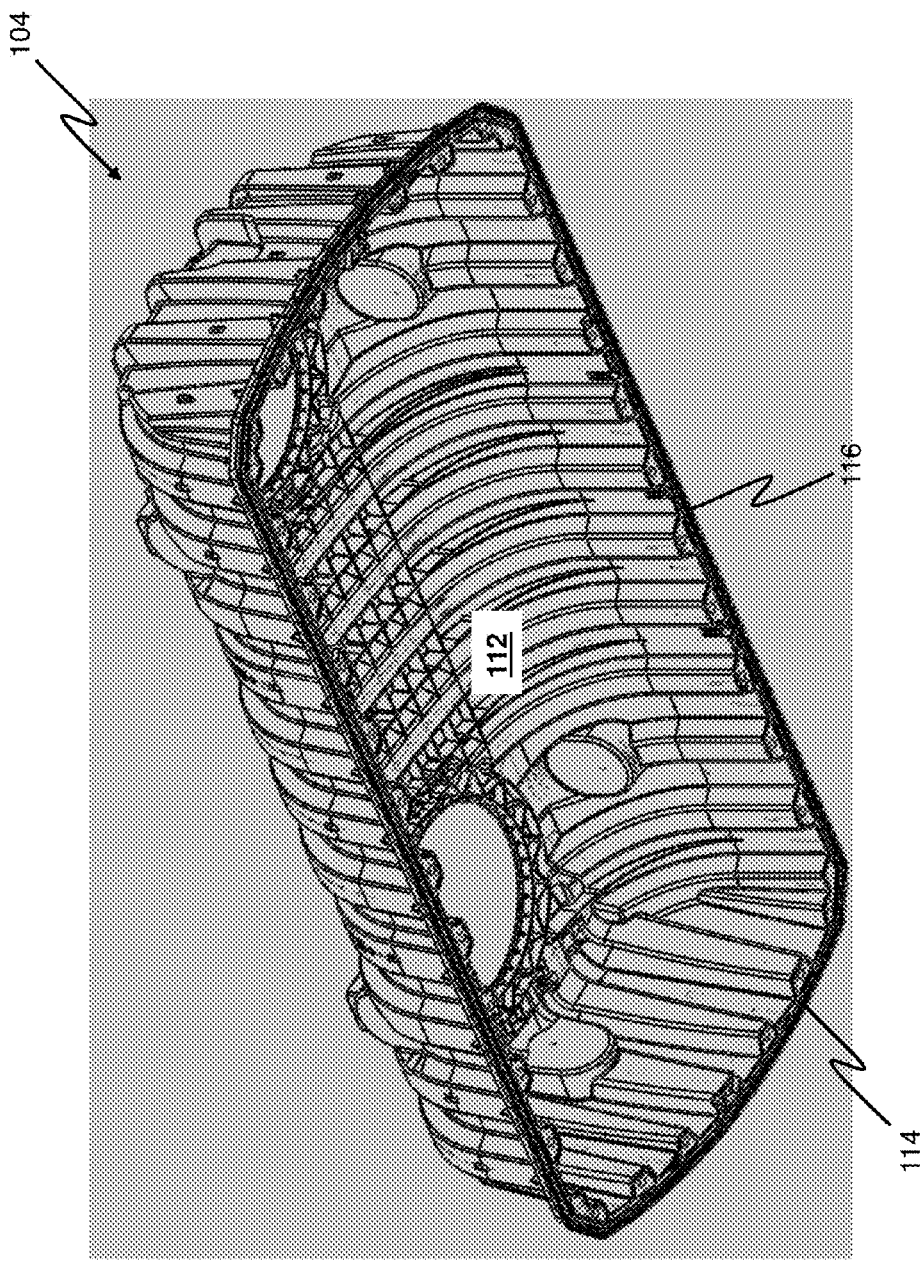
FIG. 2B is a bottom-up side isometric view of a tank top of the fully assembled septic tank of FIG. 1.
Figure 2C:
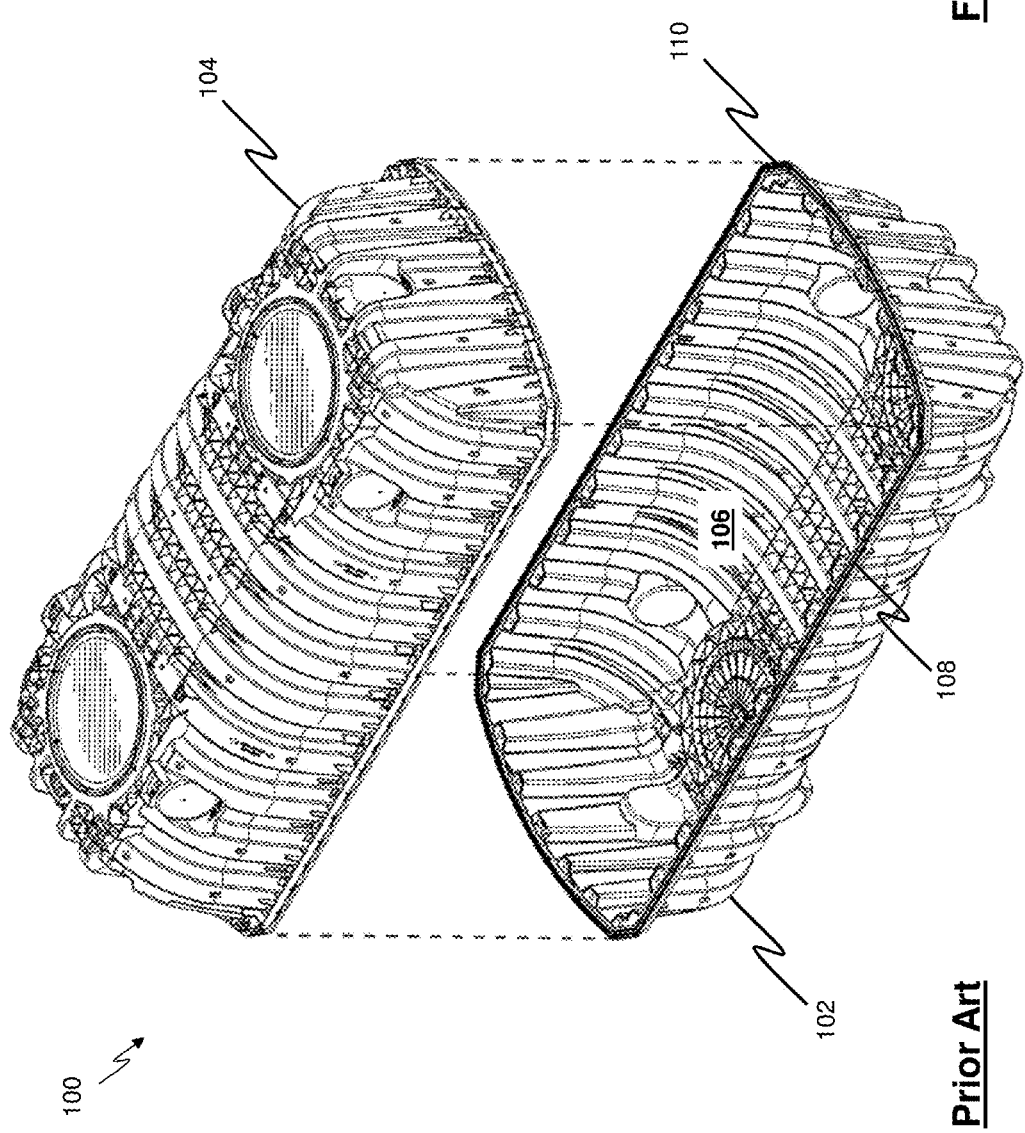
FIG. 2C is a top-down side isometric view showing how the tank bottom of FIG. 2A and the tank top of FIG. 2B are mated to form the septic tank of FIG. 1.

In accordance with one embodiment of the present invention, an internal support for a two-piece (may include single or multi-piece as well) injection molded plastic septic tank is disclosed where the internal support is configured to increase the structural strength of the tank structure to better resist contraction/compression of the tank structure due to positive and/or negative pressure while buried within soil and/or while under vacuum test. As discussed further herein, these two-piece tanks typically include a tank bottom section and a tank top section that are configured to mate together to form a tank chamber for containing liquids (and other matter) therein. The tank may further include a mid-seam gasket that is located at the mating portion of the tank bottom section and tank top section to be between the tank bottom section and tank top section seal the tank chamber such that the tank chamber can contain liquids without leaking.

Referring to FIG. 1, FIG. 2A, FIG. 2B and FIG. 2C, one example of a two-piece injection molded plastic septic tank 100 is shown and is similar to those disclosed in commonly owned patent application Ser. No. 13/412,406 of Holbrook et al. and Ser. No. 13/412,466 of Moore et al., the contents of both of which are incorporated herein by reference in their entireties. As discussed briefly above, the plastic septic tank 100 includes a tank bottom section 102 and a similarly shaped tank top section 104. The tank bottom section 102 defines a tank bottom section interior cavity 106 and includes a tank bottom section opening 108 communicated with the tank bottom section interior cavity 106, wherein the tank bottom section opening 108 is surrounded by a tank bottom section interface edge 110. Similarly, the tank top section 104 defines a tank top section interior cavity 112 and includes a tank top section opening 114 communicated with the tank top section interior cavity 112, wherein the tank top section opening 114 is surrounded by a tank top section interface edge 116. The tank bottom section 102 and the tank top section 104 are similarly shaped and configured to be mated together at the tank bottom section interface edge 110 and the tank top section interface edge 116.

It should be appreciated that when the tank bottom section 102 and the tank top section 104 are mated together the tank bottom section opening 108 and tank top section opening 114 are adjacent each other such that the tank bottom section interior cavity 106 and tank top section interior cavity 112 define a septic tank interior cavity 118. The tank top section 104 is mated to the tank bottom section 102 by locating the tank top section interface edge 116 onto the tank bottom section interface edge 110 such that they are aligned. A midseam gasket may be located at the interface of the tank top section interface edge 116 and the tank bottom section interface edge 110 to be located between the tank top section interface edge 116 and the tank bottom section interface edge 110. This advantageously seals the septic tank interior cavity 118 from the external environment and prevents the contents of the septic tank interior cavity 118 from leaking out of the tank 100. The tank bottom section 102 and tank top section 104 may be secured together via any method or device suitable to the desired end purpose, such as clips, pins, bolts, welding, etc.

Figure 3:
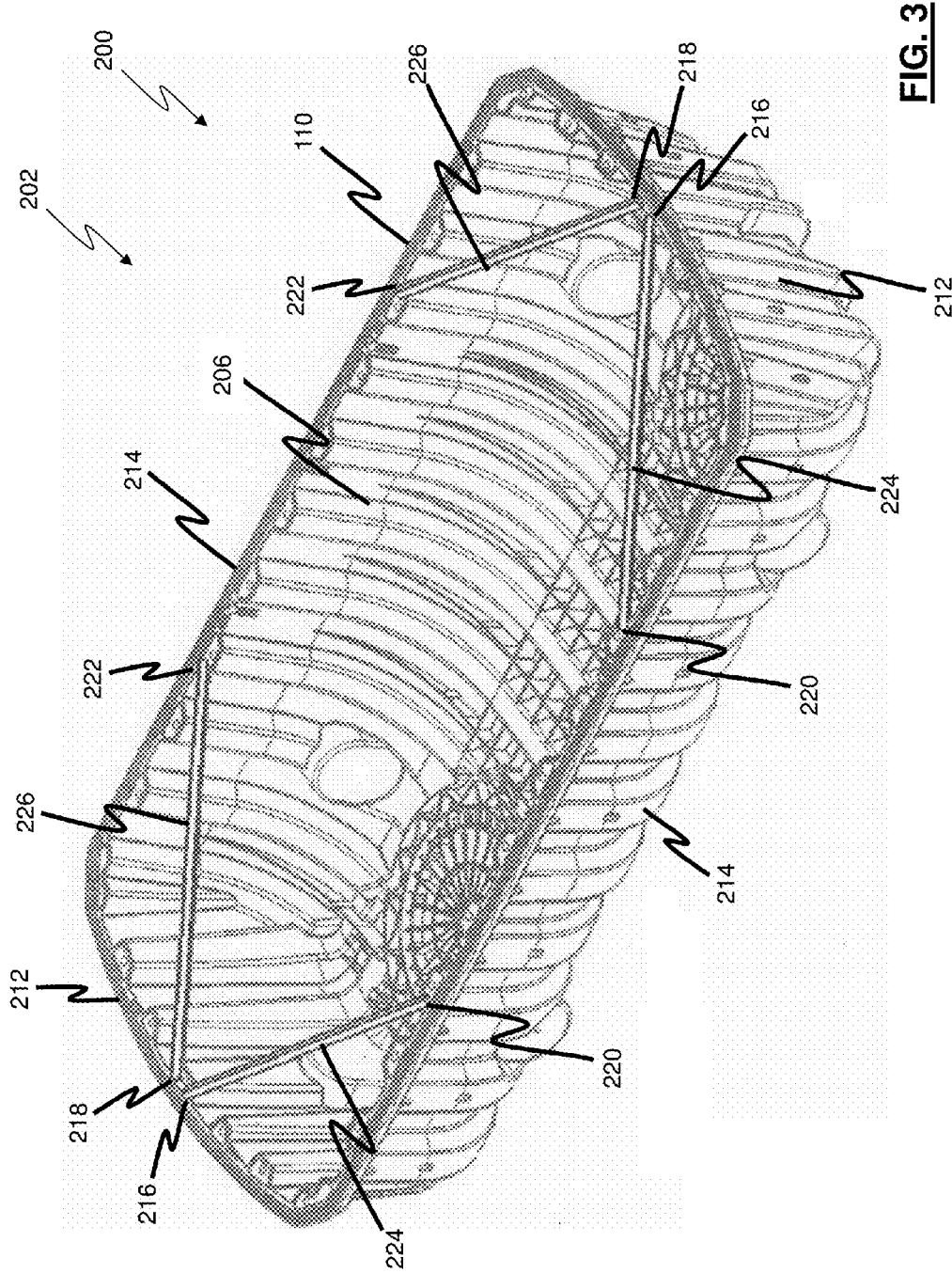
FIG. 3 is a top-down side isometric view of the tank bottom of FIG. 2A having first and second horizontal internal supports, in accordance with one embodiment of the present invention.
Figure 4:
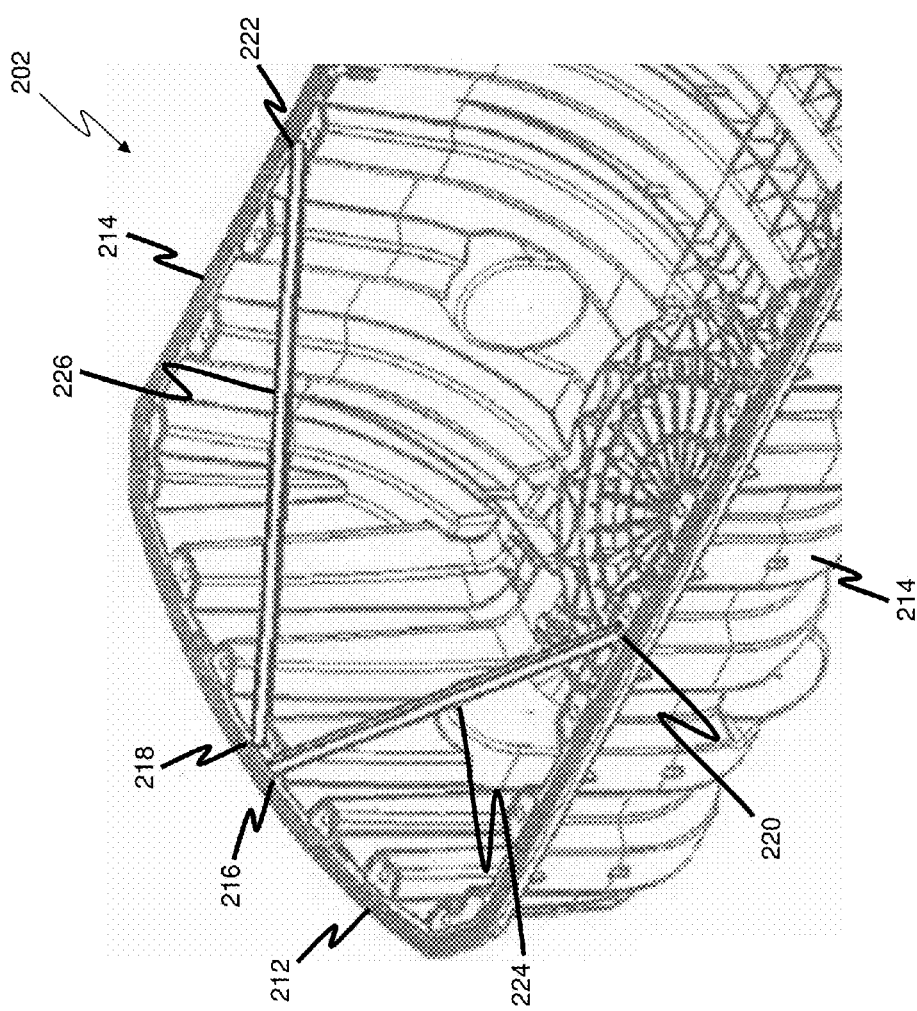
FIG. 4 is a close up view of one end of the tank bottom of FIG. 3.

Referring to FIG. 3 and FIG. 4, in accordance with one embodiment of the present invention, a two piece septic tank 200 having a tank bottom section 202 and a tank top section 204 is shown, wherein at least one of the tank bottom section 202 and the tank top section 204 includes internal supports for supporting the tank end walls and/or tank side walls. It should be appreciated that because the tank bottom section 202 and tank top section 204 are similarly shaped and configured, the invention is illustratively discussed with reference to the tank bottom section 202. It is contemplated that that which applies for the tank bottom section 202 may, if desired, apply for the tank top section 204.

The tank bottom section 202 is illustrated and includes tank end walls 212 located on each end of the tank bottom section 202 and tank side walls 214 located on each side of the tank bottom section 202. The tank bottom section 202 is configured to mate with a tank top section (not shown) that may be identical to the tank bottom section 202 to define a septic tank interior cavity 206. On each end of the tank bottom section 202, the tank end walls 212 include a first end wall pocket 216 and a second end wall pocket 218 and the tank side walls include a first side wall pocket 220 and a second side wall pocket 222, where the first side wall pocket 220 is located on one side wall 214 and the second side wall pocket 222 is located on the other side wall 214. The first end wall pocket 216 is configured to be aligned with the first side wall pocket 220 and the second end wall pocket 218 is configured to be aligned with the second side wall pocket 222. A first internal support 224 is provided and is positioned such that one end of the first internal support 224 is located within the first end wall pocket 216 and the other end of the first internal support 224 is located within the first side wall pocket 220. Similarly, a second internal support 226 is provided and is positioned such that one end of the second internal support 226 is located within the second end wall pocket 218 and the other end of the second internal support 226 is located within the second side wall pocket 222

Figure 5:
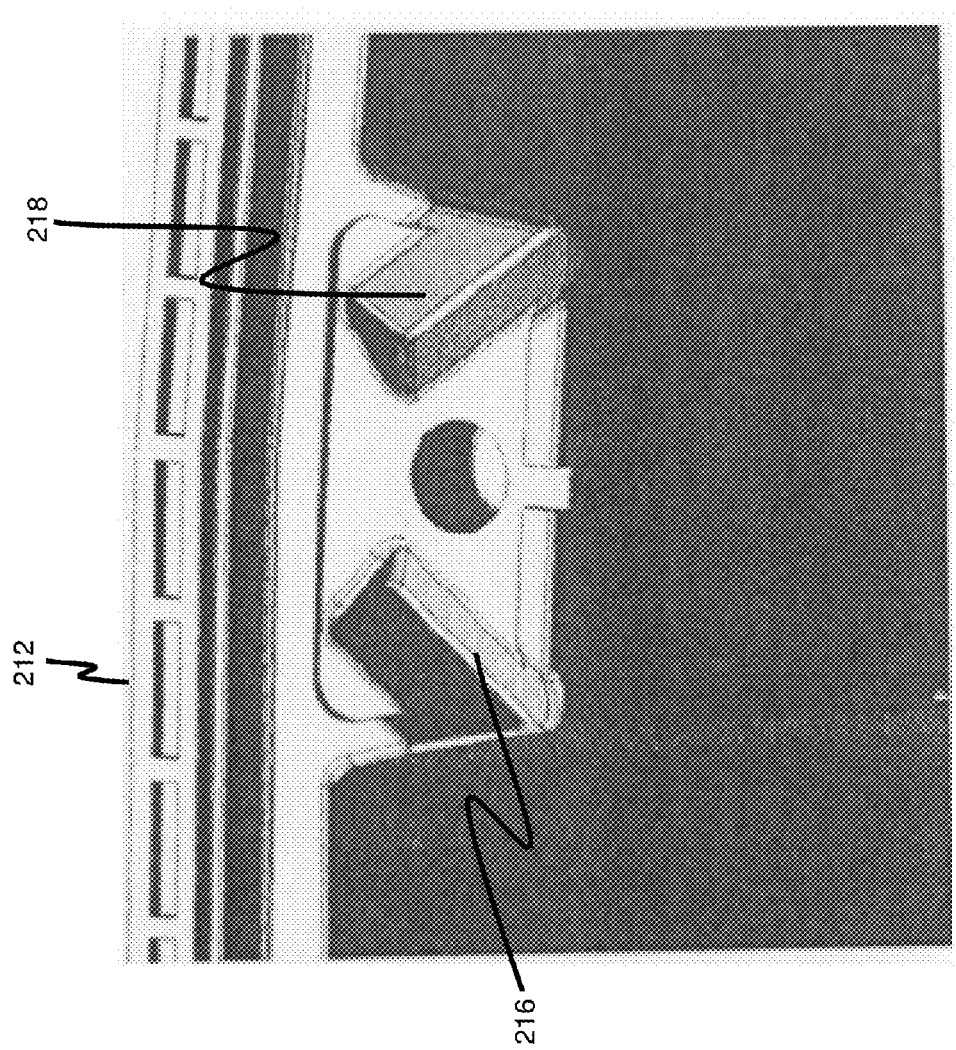
FIG. 5 shows the end wall pockets on the end wall portion of the tank bottom of FIG. 3, in accordance with one embodiment of the invention.
Figure 6:
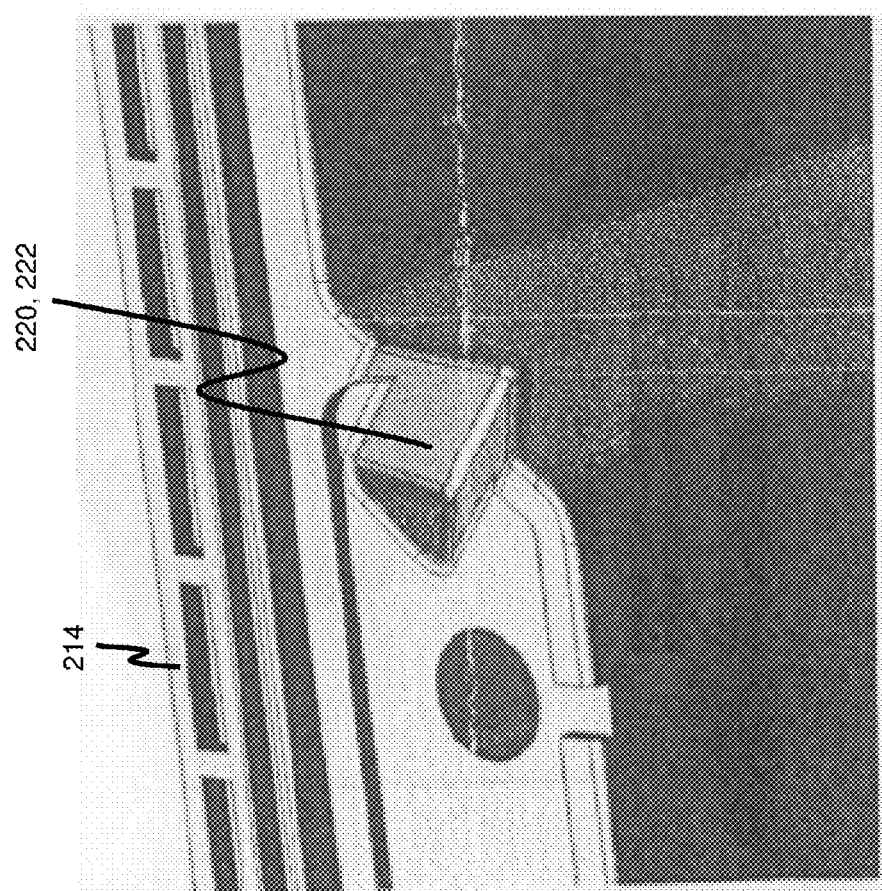
FIG. 6 shows a side wall pocket on the side wall portion of the tank bottom of FIG. 3, in accordance with one embodiment of the invention.

The first and second end wall pockets 216, 218 and first and second side wall pockets 220, 222 (only one side shown) are shown in more detail in FIG. 5 and FIG. 6, respectively. It should be appreciated that each of the first and second end wall pockets 216, 218 and first and second side wall pockets 220, 222 are configured to receive and contain an end portion of the internal supports 224, 226. It should also be appreciated that as shown herein, the internal supports 224, 226 are shown as being substantially rectangular (square) in shape. Accordingly the end wall pockets 216, 218 and side wall pockets 220, 222 are substantially square in shape to contain the internal supports 224, 226. However, it is contemplated that the internal supports 224, 226 may be any shape as desired such as triangular, rectangular, round (cylindrical) and the end wall pockets 216, 218 and side wall pockets 220, 222 would be shaped and configured accordingly to receive and contain the end portions of the internal supports 224, 226.

In accordance with the invention, the internal supports 224, 226 are preferably constructed from a rigid material capable of withstanding forces (compressive) on the tank end walls 212 and/or tank side walls 214 to limit distortion of the tank structure to between about 0.5% to 5% distortion (preferably to a 2% maximum distortion). For example, in one embodiment the first internal support 224 and second internal support 226 may be configured (located/arranged) and/or constructed from a rigid material capable of preventing the tank from distorting more than a maximum of about 2% when a vacuum of about 5.8 inches of Hg (range of 3" to 7" of Hg) is applied to the septic tank interior cavity 206. The first internal support 224 may be associated with the tank bottom section 202 by locating one end of the first internal support 224 in the first end wall pocket 216 and the other end of the first internal support 224 in the first side wall pocket 220. Similarly, the second internal support 226 may be associated with the tank bottom section 202 by locating one end of the second internal support 226 in the second end wall pocket 218 and the other end of the second internal support 226 in the second side wall pocket 222. It should be appreciated that, if desired, the first internal support 224 may be associated with the tank top section 204 by locating one end of the first internal support 224 in the first end wall pocket 216 and the other end of the first internal support 224 in the first side wall pocket 220. Similarly, the second internal support 226 may be associated with the tank top section 204 by locating one end of the second internal support 226 in the second end wall pocket 218 and the other end of the second internal support 226 in the second side wall pocket 222.

Additionally, it is contemplated that the end portions of the internal supports 224, 226 may rest within the end wall pockets 216, 218 and/or side wall pockets 220, 222 or the ends of the internal supports 224, 226 may be secured within the end wall pockets 216, 218 and/or side wall pockets 220, 222. For example, in one embodiment, the end portions of the internal supports 224, 226 may be secured within the end wall pockets 216, 218 and/or side wall pockets 220, 222 via a securing means, such as a clip, a screw, a bolt, an adhesive, etc. In another embodiment, the end wall pockets 216, 218 and/or side wall pockets 220, 222 may be configured to frictionally contain (such as via press fit) the end portions of the internal supports 224, 226. One way this press fit may be accomplished may include the walls of the end wall pockets 216, 218 and/or side wall pockets 220, 222 may have protruding portions (not shown) where the end portions of the internal supports 224, 226 would be 'pressed' into and snugly held within the pockets by the protruding portions. In still yet another embodiment, the end wall pockets 216, 218 and/or side wall pockets 220, 222 may be partially enclosed and the end portions of the internal supports 224, 226 may be inserted into the partially enclosed end wall pockets 216, 218 and/or side wall pockets 220, 222. In this case, the length of the internal supports 224, 226 may (or may not) be telescoping to be expandable/retractable, where the length of the internal supports 224, 226 could then be secured via a dowel/pin.

Figure 7:
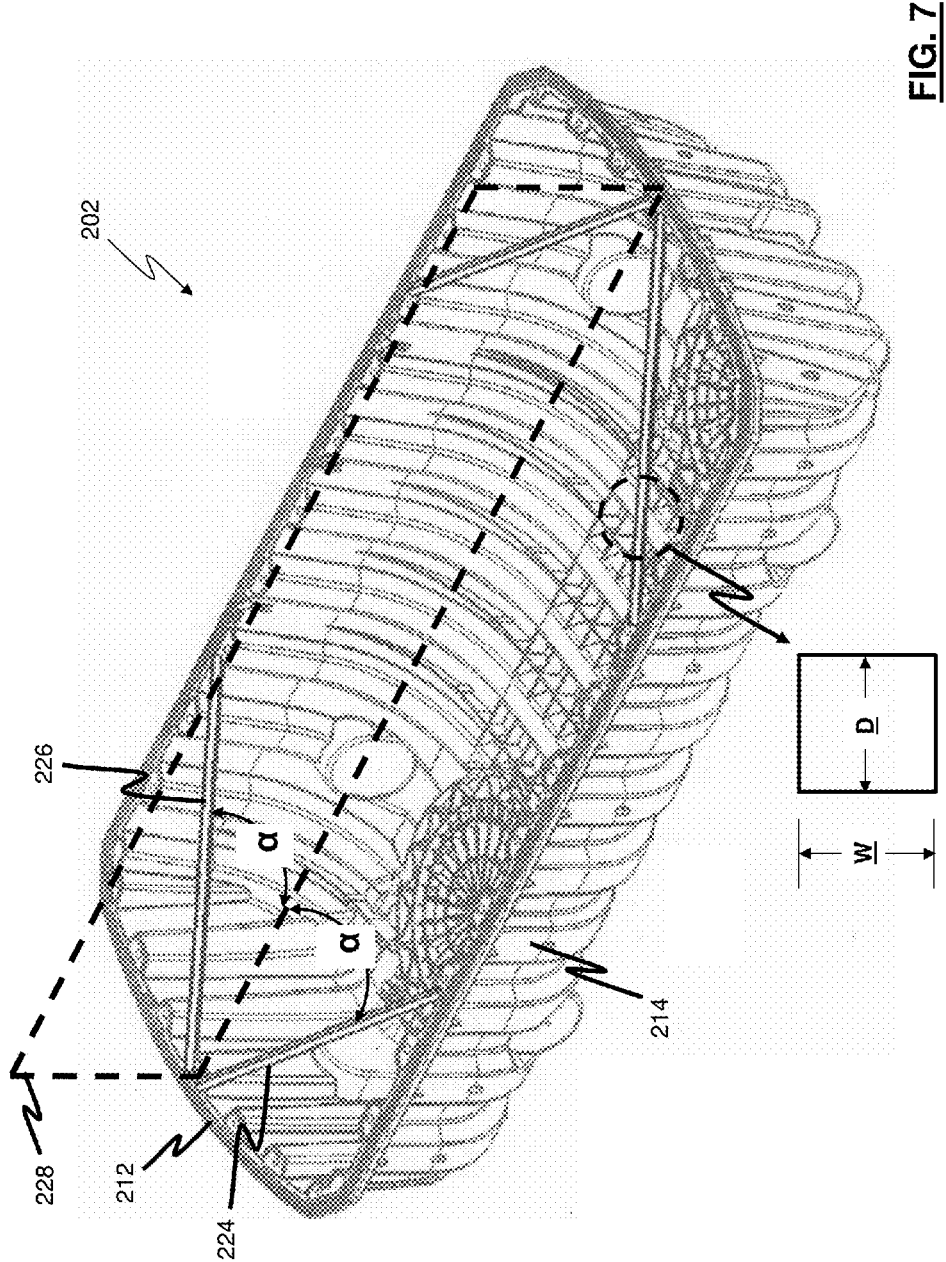
FIG. 7 is a top-down side isometric view of the tank bottom of FIG. 3.

Referring to FIG. 7, a tank section 202, 204 is shown where the first internal support 224 and second internal support 226 are located in the end wall pockets 216, 218 and side wall pockets 220, 222, respectively. As can be seen, the first internal support 224 and second internal support 226 are positioned to be diagonal relative to an imaginary vertical plane 228 that runs lengthwise of the tank bottom section 202. For example, in one embodiment the first internal support 224 and second internal support 226 may be positioned at an angle α to be within a range of between about 0° to about 90° relative to an imaginary vertical plane 228 that runs lengthwise of the tank section 202, 204. It should be appreciated that the first internal support 224 and second internal support 226 may be located on one end 214 or on both ends 214 of the tank 202 to increase the structural integrity on each end 214 of the tank 202.

Figure 9A:
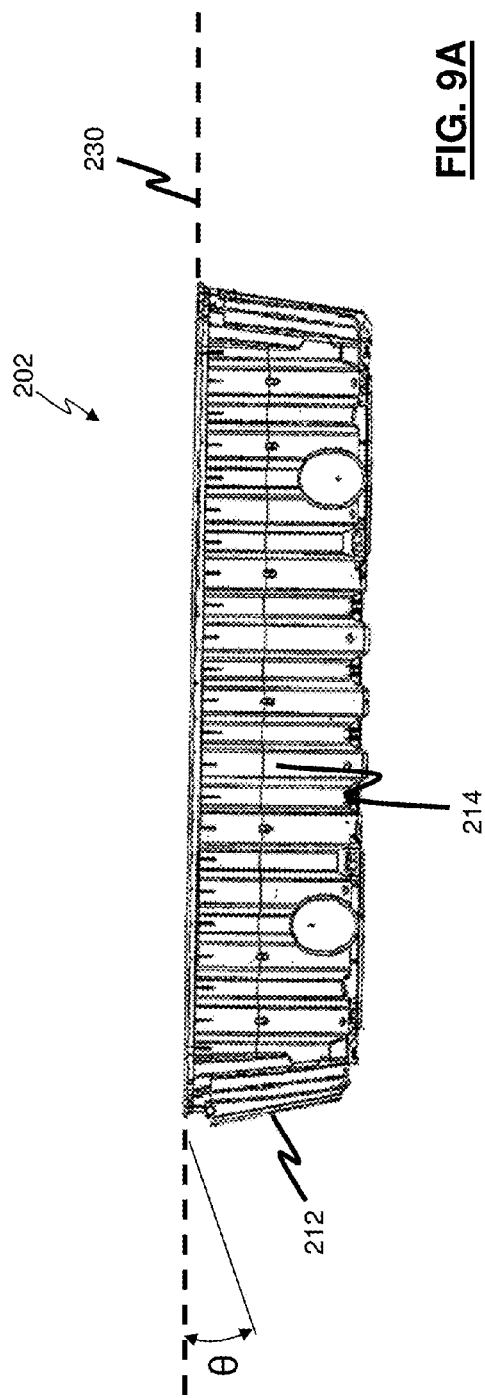
FIG. 9A is a side view of the tank bottom section of FIG. 3.
Figure 9B:
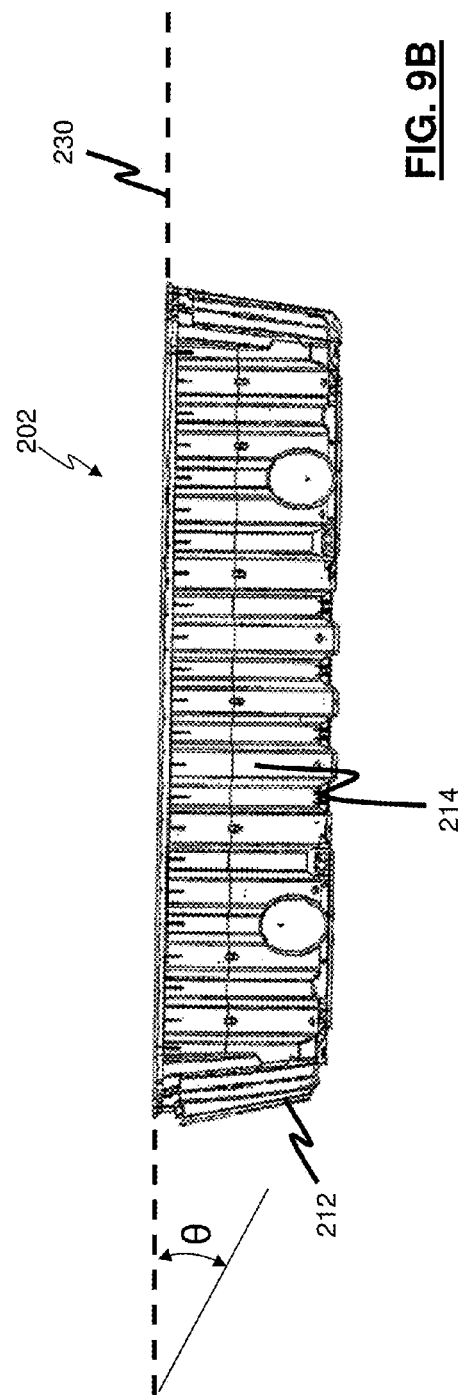
FIG. 9B is a side view of the tank bottom section of FIG. 3.

Furthermore, as disclosed hereinabove and referring to FIG. 8, in one embodiment of the invention the first internal support 224 and second internal support 226 may be positioned to be substantially horizontal relative to an imaginary horizontal plane 230 that runs side to side (transverse) of the tank section 202, 204. In an additional embodiment of the invention, it is contemplated that the first internal support 224 and/or second internal support 226 may be angled downward or upward so as to be non-horizontal by an angle θ. For example, referring to FIG. 9A, in one embodiment the first end wall pocket 216 and/or second end wall pocket 218 may be located lower than the first side wall pocket 220 and/or second side wall pocket 222 such that the first internal support 224 and/or second internal support 226 are angled downward toward the ends of the tank section 202, 204. In another embodiment and referring to FIG. 9B, the first side wall pocket 220 and/or second side wall pocket 222 may be located lower than the first end wall pocket 216 and/or second end wall pocket 218 such that the first internal support 224 and/or second internal support 226 are angled downward toward the side walls of the tank section 202, 204.

Figure 10:
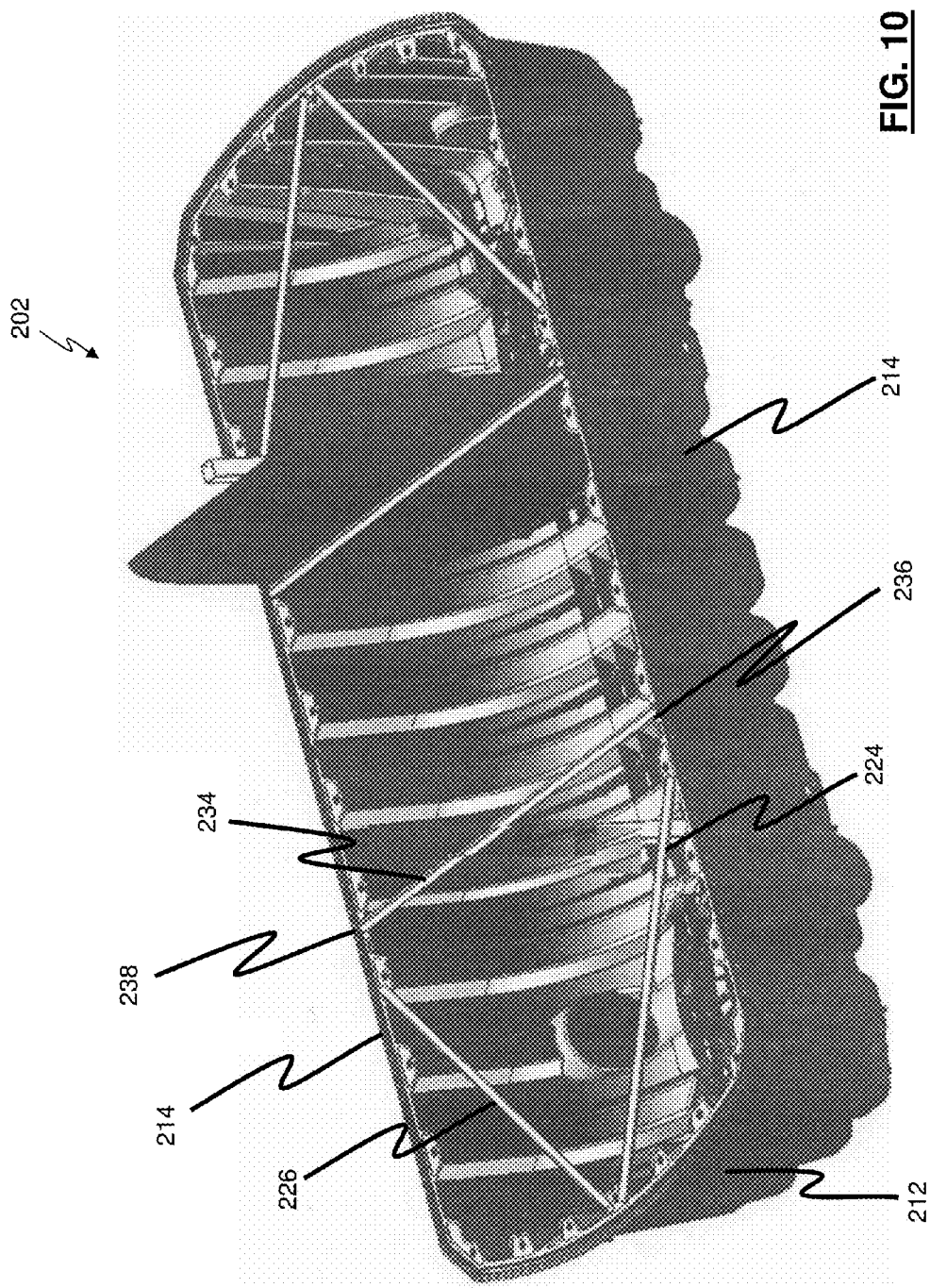
FIG. 10 is a top-down side isometric view of a tank bottom of a two piece septic tank showing first, second and third internal supports, in accordance with an additional embodiment of the present invention.
Figure 11:
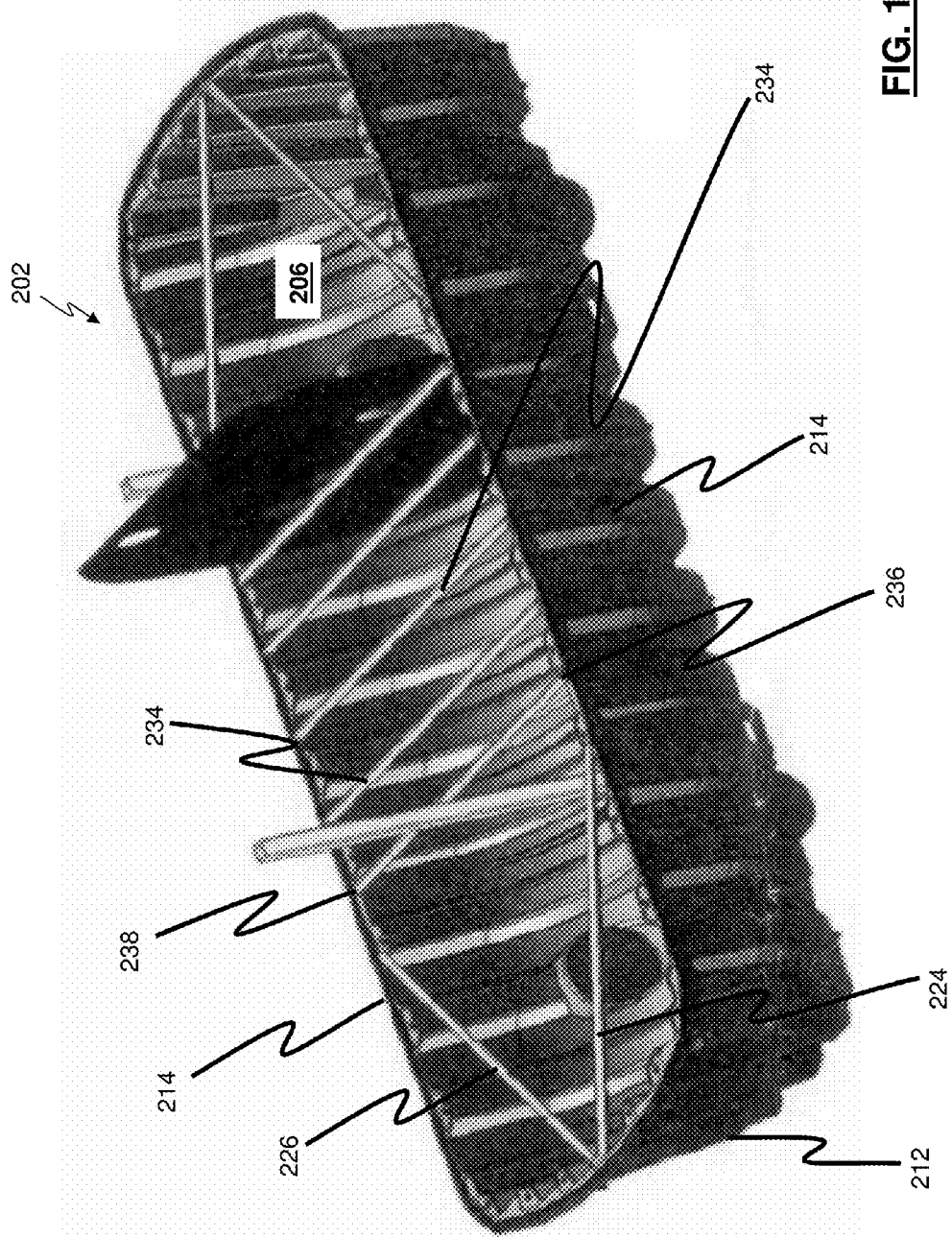
FIG. 11 is a top-down side isometric view of a tank bottom section of a two piece septic tank showing first, second and multiple transverse internal supports, in accordance with still yet another embodiment of the present invention.
Figure 12B:
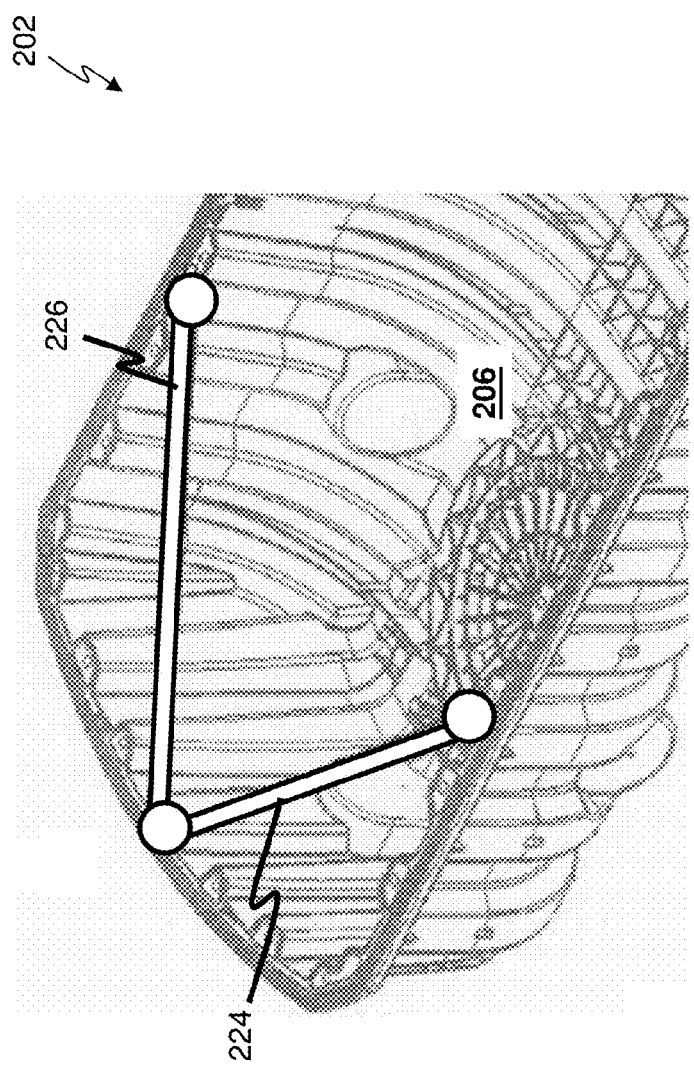
FIG. 12B is a top-down side isometric view of a one end of a tank bottom with the first and second internal supports of FIG. 12A installed.
Figure 12D:
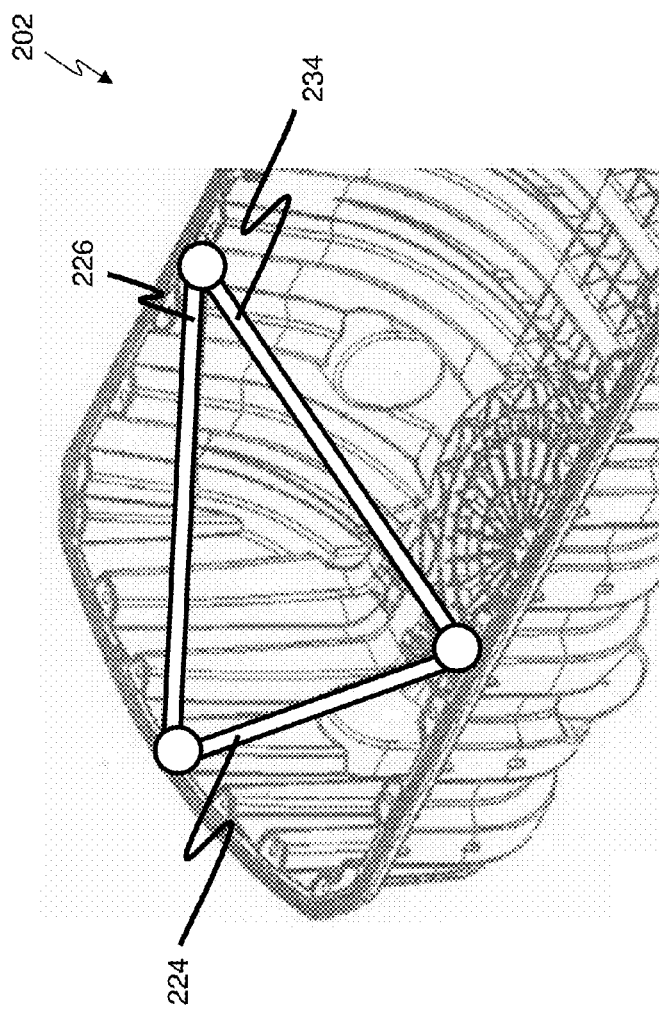
FIG. 12d is a top-down side isometric view of one end of a tank bottom with the first, second and third internal supports of FIG. 12C installed.

In still yet another embodiment and referring to FIG. 10, a third internal support 234 may be provided and may be used alone or in combination with the first internal support 224 and/or second internal support 226. It should be appreciated that the third internal support 234 may be positioned such that one end of the third internal support 234 may be located in a side wall pocket 236 on one of the tank side walls 214 and the other end of the third internal support 234 may be located in a side wall pocket 238 on the other of the tank side walls 214. Additionally, it is contemplated that one or more of the third internal supports 234 may be included as desired (positioned along the length of the tank 202, 204 also as desired) with or without the first and second internal supports 224, 226 (See FIG. 11). Furthermore, although the third internal supports 234 are shown as being substantially horizontal relative to imaginary horizontal plane 230 (See FIG. 8) that runs from side to side (transverse) of the tank 202, 204 and perpendicular relative to an imaginary vertical plane 228 (See FIG. 7) that runs lengthwise of the tank 202, 204, it is contemplated that one or more of the third internal supports 234 may be angled in the horizontal plane to be substantially diagonal between the side walls 214 and/or angled in the vertical plane such that one end of the third internal supports 234 is located in one horizontal plane and the other end of the third internal supports 234 is located in another horizontal plane. It should be appreciated that the one or more third internal supports 234 may be similar to the first and second internal supports 224, 226 and thus may be expandable/retractable and may be any shape and size suitable to the desired end purpose as described hereinabove. Moreover, the side wall pockets 236, 238 may be similar to the side wall pockets 220, 222 and the third internal support may be contained within the pockets 236, 238, as described hereinabove with reference to the wall pockets 216, 218, 220, 222.

In addition, it is contemplated that the tank top section 204 which mates with the tank bottom section 202 to enclose the tank interior 206 may be identical to the tank bottom section 202 such that the tank top section 204 also may include the first internal support 224, the second internal support 226 and/or the third internal support 234 as briefly discussed hereinbefore. Moreover, in an additional embodiment the first internal support 224, the second internal support 226 and/or third internal support 234 may be sized to extend above the edges of the tank bottom section 202 (or tank top section 204) such that when the tank bottom section 202 and tank top section 204 are mated together the internal supports 224, 226, 234 are partially contained in the end wall pockets and/or side wall pockets of both the tank bottom section 202 and tank top section 203 to provide increased strength to the tank bottom section 202 and tank top section 204.

In still yet another embodiment, the internal supports 224, 226 and/or internal supports 224, 226, 234 may be constructed as a single article as shown in FIG. 12A, FIG. 12B, FIG. 12C and FIG. 12D, respectively. It should be appreciated that the internal supports 224, 226, 234 may be securely associated with the tank section 202, 204 via any device or method suitable to the desired end purpose. For example, in one embodiment, the internal supports 224, 226, 234 may be connected together at a connection point 240 which includes a hollow area 242, where the hollow area 242 may be configured to receive and snugly contain a protruding member (not shown) of the tank section 202, 204. Additionally, the hollow area 242 may be configured to receive and contain a protruding member (not shown) of the tank section 202, 204 where the protruding member (not shown) may be threaded such that the internal supports 224, 226, 234 may be bolted to the tank section 202, 204. In still yet another embodiment, the internal supports 224, 226 may be substantially triangular (wedge) shaped as shown in FIG. 13.

Figure 14:
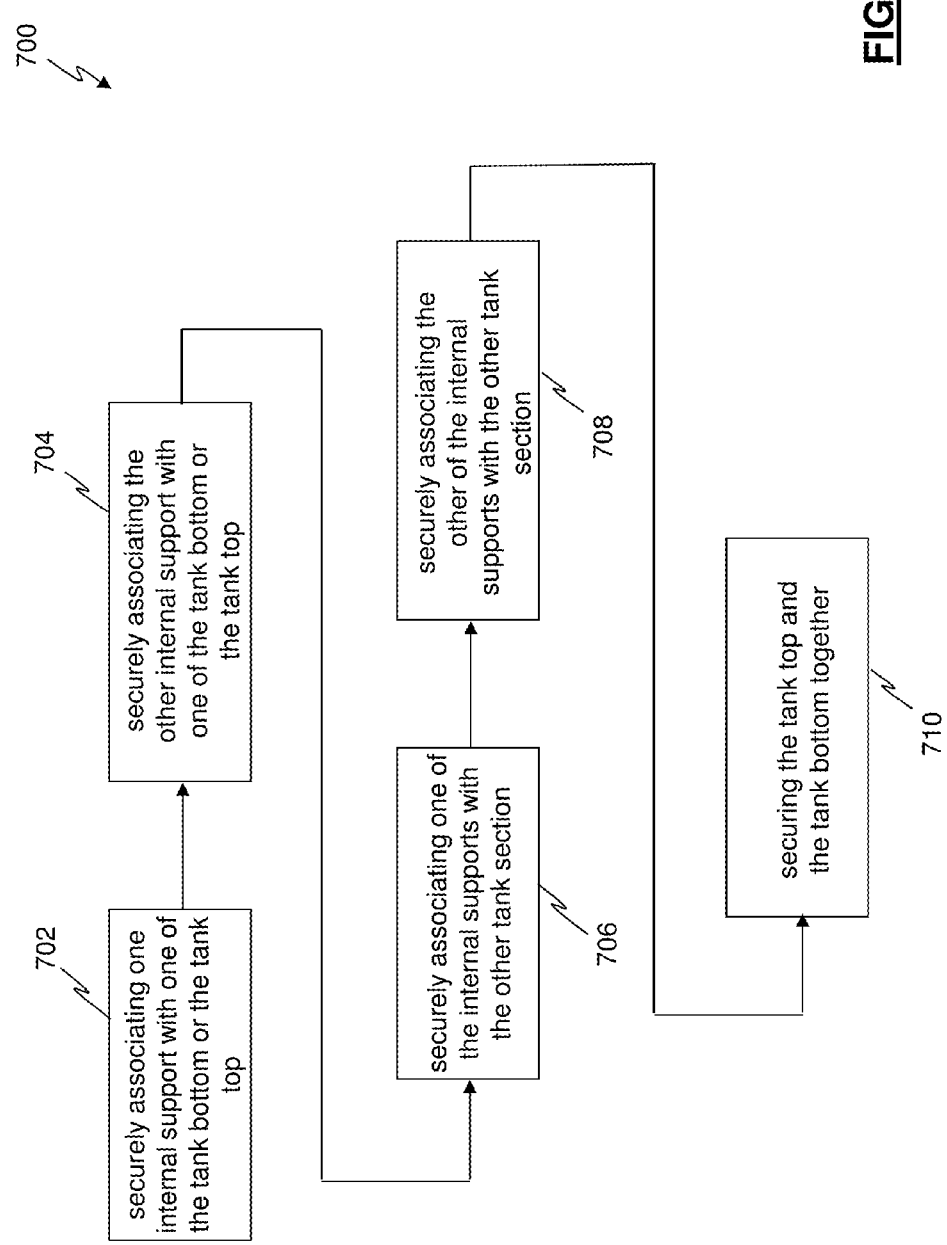
FIG. 14 is an operational block diagram illustrating a method for supporting the end wall and/or side wall of a septic tank, in accordance with one embodiment of the invention.

In accordance with an additional embodiment of the invention and referring to FIG. 14, a method 700 for supporting the end wall and/or side wall of a septic tank 200 having an end wall pocket 216, 218 located within the tank interior to be on an interior surface of the tank end wall 212 and/or a side wall pocket 220, 222 located within the tank interior to be on an interior surface of the tank side wall 214, and a supporting member 224, 226 having a first supporting member end and a second supporting member end is provided. The method 700 includes securely associating one of the internal supports 224, 226 with one of the tank bottom section 202 or tank top section 204 as shown in operational block 702. This may be accomplished by locating the first supporting member end to be in an end wall pocket and the second supporting member end to be in a side wall pocket. The method 700 further includes securely associating the other of the internal supports 224, 226 with the other of the tank bottom section 202 or the tank top section 204, as shown in operational block 704. As above, this may be accomplished by locating the first supporting member end of an internal support 224, 226 to be in the other end wall pocket and the second supporting member end of an internal support 224, 226 to be in the other side wall pocket. The method 700 further includes securely associating one of the internal supports 224, 226 with the other tank section 202, 204, as shown in operational block 706, and securely associating the other of the internal supports 224, 226 with the other tank section 202, 204, as shown in operational block 708. If desired, a third internal support 234 can be securely associated with one of or both of the tank bottom section 202 and/or the tank top section 204.

The method 700 further includes positioning the tank top section 204 onto the tank bottom section 202, such that the tank top section interface edge 116 is aligned with the tank bottom section interface edge 110, as shown in operational block 710. If desired, a mid-seam gasket may be located between the tank top section interface edge 116 and the tank bottom section interface edge 110 to seal the seam formed interface edges 110, 116. The top tank section 204 and the bottom tank section 202 are then securely connected together to form the septic tank 200, as shown in operational block 712.

It should be appreciated that as described above, the internal supports 224, 226, 234 may be assembled prior to connecting the tank top section 204 and the tank bottom section 202. Or in another embodiment, (such as where the internal supports 224, 226, 234 are expandable/retractable), they may be assembled after connecting the tank top section 204 and the tank bottom section 202 by accessing the tank interior portion 206 via a tank access port. Additionally, although the internal supports 224, 226, 234 and the method of assembling the internal supports 224, 226, 234, are discussed herein with regards to a two-piece tank, the invention may be adapted to single or multi-piece (i.e. more than two-piece) tanks.

In accordance with still yet another embodiment of the present invention, a septic tank 500 having one or more vertical braces or struts and a method for installing the vertical braces or struts in the septic tank is disclosed, wherein the septic tank may be a single-piece construction or a multi-piece construction and includes a tank top portion and a tank bottom portion. As discussed further hereinafter, the tank 500 includes a top pocket located on the tank top portion and a bottom pocket located on the tank bottom portion, where the tank top portion also includes a top channel which leads to the top pocket and/or the tank bottom portion includes a bottom channel which leads to the bottom pocket. The top pocket (and/or bottom pocket) is configured to receive and contain the vertical brace and the bottom channel (and/or top channel) includes a compressibly resilient member or latch whose natural configuration is to extend into the bottom channel (and/or top channel) where one edge of the compressibly resilient member or latch forms one wall of the bottom pocket (or top pocket). It should be appreciated that the pocket may be formed by complete walls or it may be formed by partial walls as disclosed hereinafter.

In one embodiment and as discussed further hereinafter, to install the vertical brace, one end of the vertical brace, which may be rectangular (square), round (cylindrical), triangular, or any other shape suitable to the desired end purpose, is located within the top pocket (or bottom pocket as the case may be) and the other end of the vertical brace is located in the bottom channel (or top channel as the case may be) such that the vertical brace is on an angle. The end of the vertical brace that is located in the bottom channel (or top channel) is then slid along the bottom channel (or top channel) toward the bottom pocket (or top pocket). As the end of the vertical brace encounters the compressibly resilient member or latch, the compressibly resilient member or latch is compressed to allow the end of the vertical brace to slide over (or passed) the compressibly resilient member or latch and into the bottom pocket (or top pocket) such that the vertical brace is substantially straight (i.e. not on an angle). Once the end of the vertical brace slides completely over the compressibly resilient member or latch, the compressibly resilient member or latch returns to its natural position, thereby forming one wall (or a partial wall) of the bottom pocket (or top pocket) and securely retaining the end of the vertical brace within the bottom pocket (or top pocket).

Figure 15:
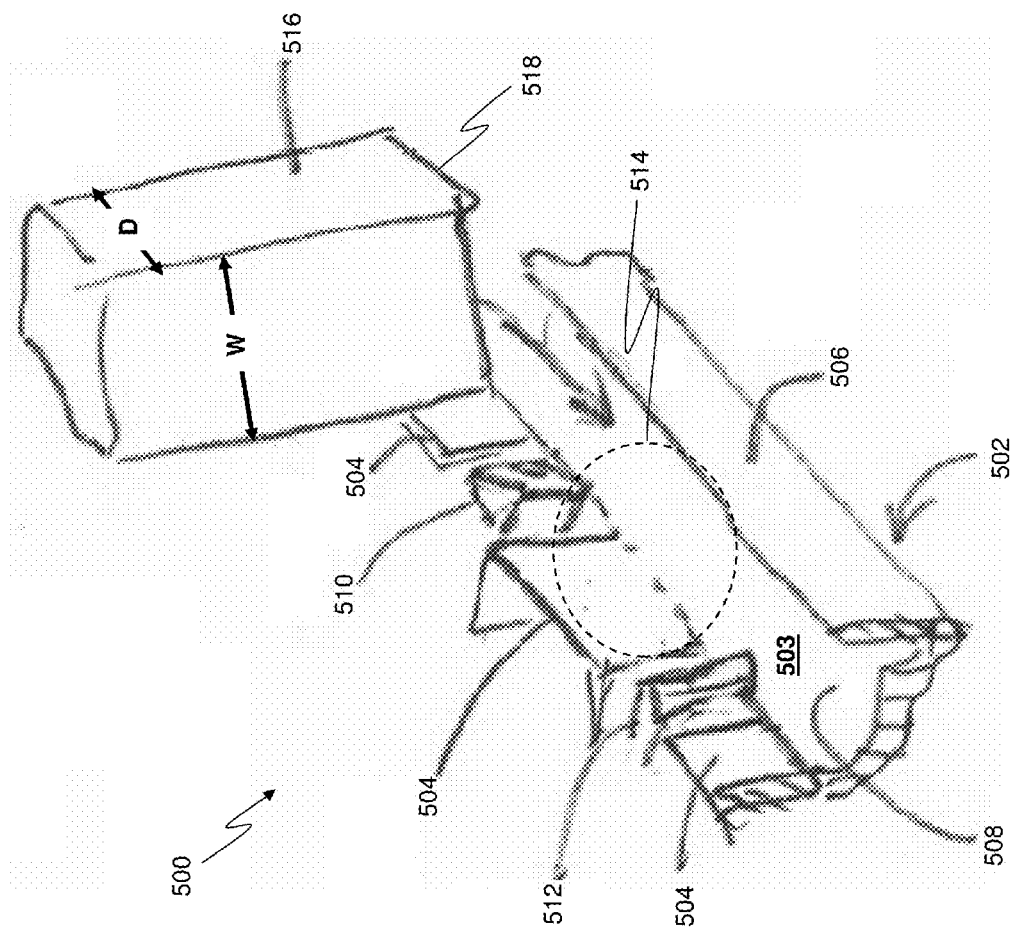
FIG. 15 is an isometric sectional side view of a tank bottom and a vertical support being associated with the tank bottom, in accordance with still yet another embodiment.
Figure 16:
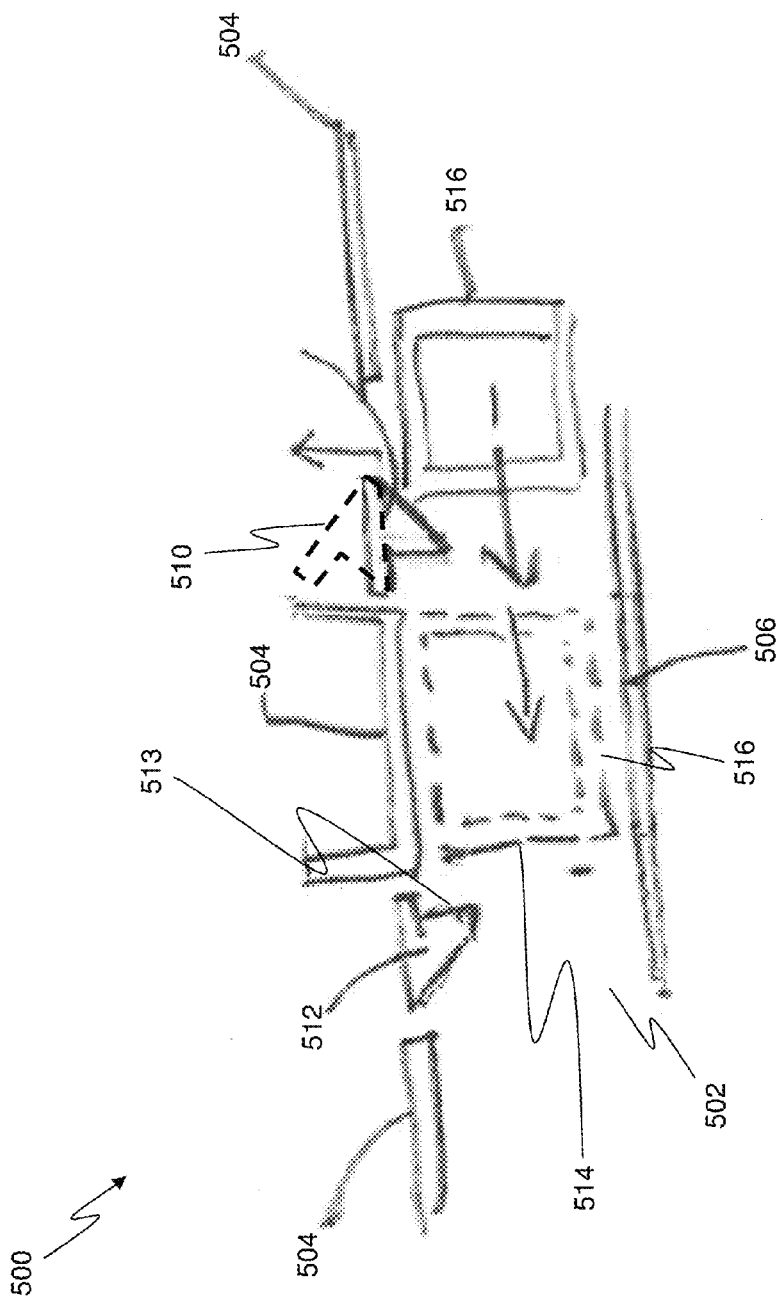
FIG. 16 is top down view of the tank bottom and the vertical support of FIG. 15, being associated with the tank bottom.

Referring to FIG. 15 and FIG. 16, one embodiment of the invention is illustrated using a section of the interior portion of a septic tank 500 which shows a channel structure 502 which defines a channel 503 running transversely (or may be lengthwise as desired) along the bottom (or top) of the tank 500, where the channel 503 is formed by opposing vertical sidewalls 504, 506 and a channel base 508. A plurality of latches 510, 512 are located along one or both of the opposing sidewalls 504, 506 and forms a 'pocket' 514 (i.e. an area where the brace will be captured and substantially contained within where it is prevented from moving along the channel 503 as discussed below). A first end (not shown) of a vertical brace 516 or strut is located in a pocket or groove (not shown) on the top portion of the tank (also not shown) and the second end 518 of the vertical brace 516 is located within the channel 503. The second end 518 of the brace 516 is rotated (or slid) along the channel 503 toward the pocket 514 such that the brace 516 encounters at least one of the plurality of latches 510, 512.

Figure 17:
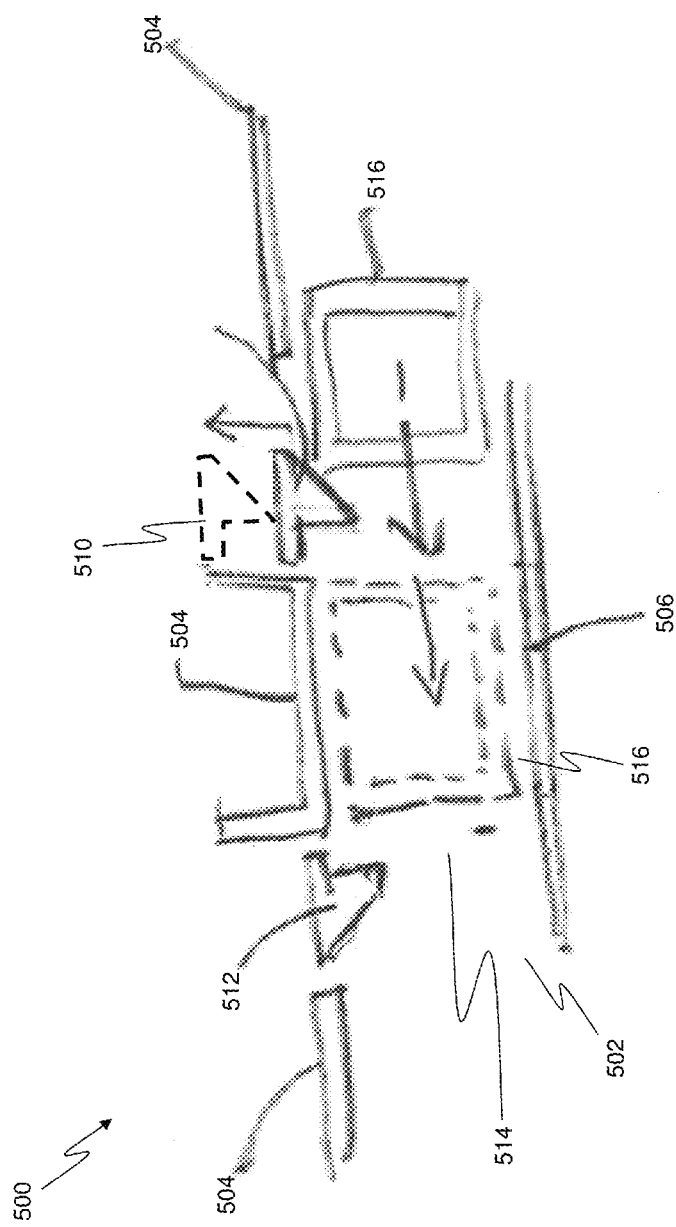
FIG. 17 is top down view of the tank bottom section and the vertical support of FIG. 15, being associated with the tank bottom, in accordance with still yet another embodiment of the invention.

As the brace 516 is moved along the channel 503, the brace 516 forces the latch 510, 512 to compress allowing the brace 516 to pass into the pocket 514. The compressed latch 510, 512 then decompresses back to original location thereby extending into the channel and preventing the brace 516 from being removed from the pocket 514. It should be appreciated that the latches 510, 512 are configured so that they only compress when the brace is located outside of the pocket 514 and moved toward the pocket 514. For example, referring again to FIG. 16, in one embodiment the latches 510, 512 include a latch flat side 513 which is located proximate the pocket 514 while the other side of the latches 510, 512 not proximate the pocket 514 are angled. Thus, as the brace 516 is moved along the channel 503 toward the pocket 514, the brace 516 slides along the angled surface of the latch 510, 512 causing the latch 510, 512 to compress thereby allowing the brace 516 to pass by the latch 510, 512 into the pocket 514. As the brace completely passes the latch 510, 512, the latch 510, 512 becomes decompressed thereby extending back into the channel 503 thereby capturing the brace 516 within the pocket 514. However, when the brace 516 is located in the pocket 514 any attempted movement of the brace 516 along the channel 503 results in the brace 516 encountering the flat surface 513 of the latch 510, 512. Because the latch 510, 512 cannot compress, the flat surface 513 of the latch 510, 512 acts as a wall preventing the brace 516 from exiting the pocket 514. It should be appreciated that the latch 510, 512 may compressibly rotate (as shown in FIG. 16) or the latch 510, 512 may be 'pushed' in (as shown in FIG. 17). Moreover, it should be further appreciated that one or more of the plurality of latches 510, 512 may be compressibly resilient to allow the brace 516 to be installed from one side or both sides of the pocket 514, as desired.

Figure 18:
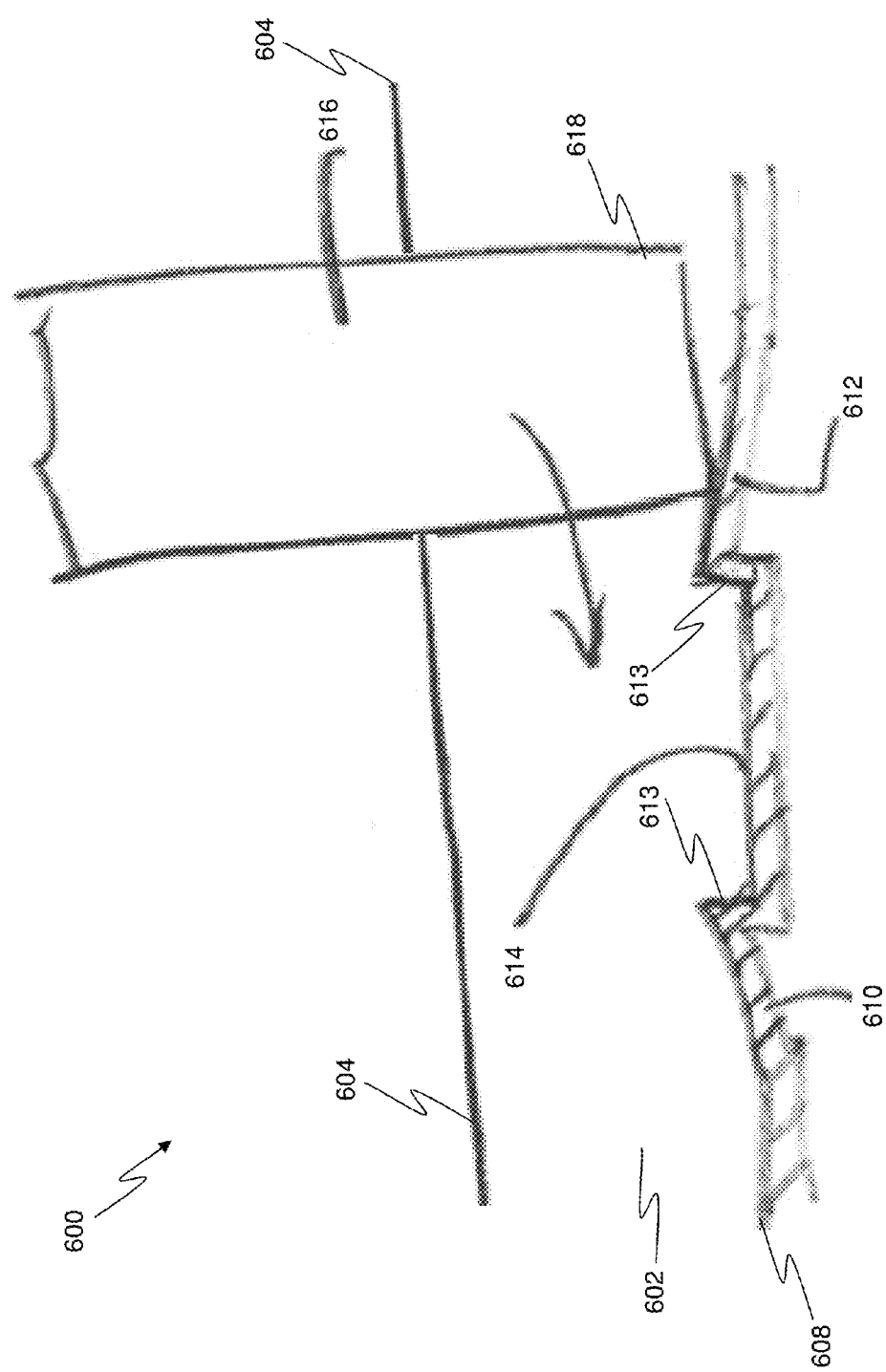
FIG. 18 is a sectional side view of a tank bottom and a vertical support being associated with the tank bottom, in accordance with an additional embodiment.
Figure 19:
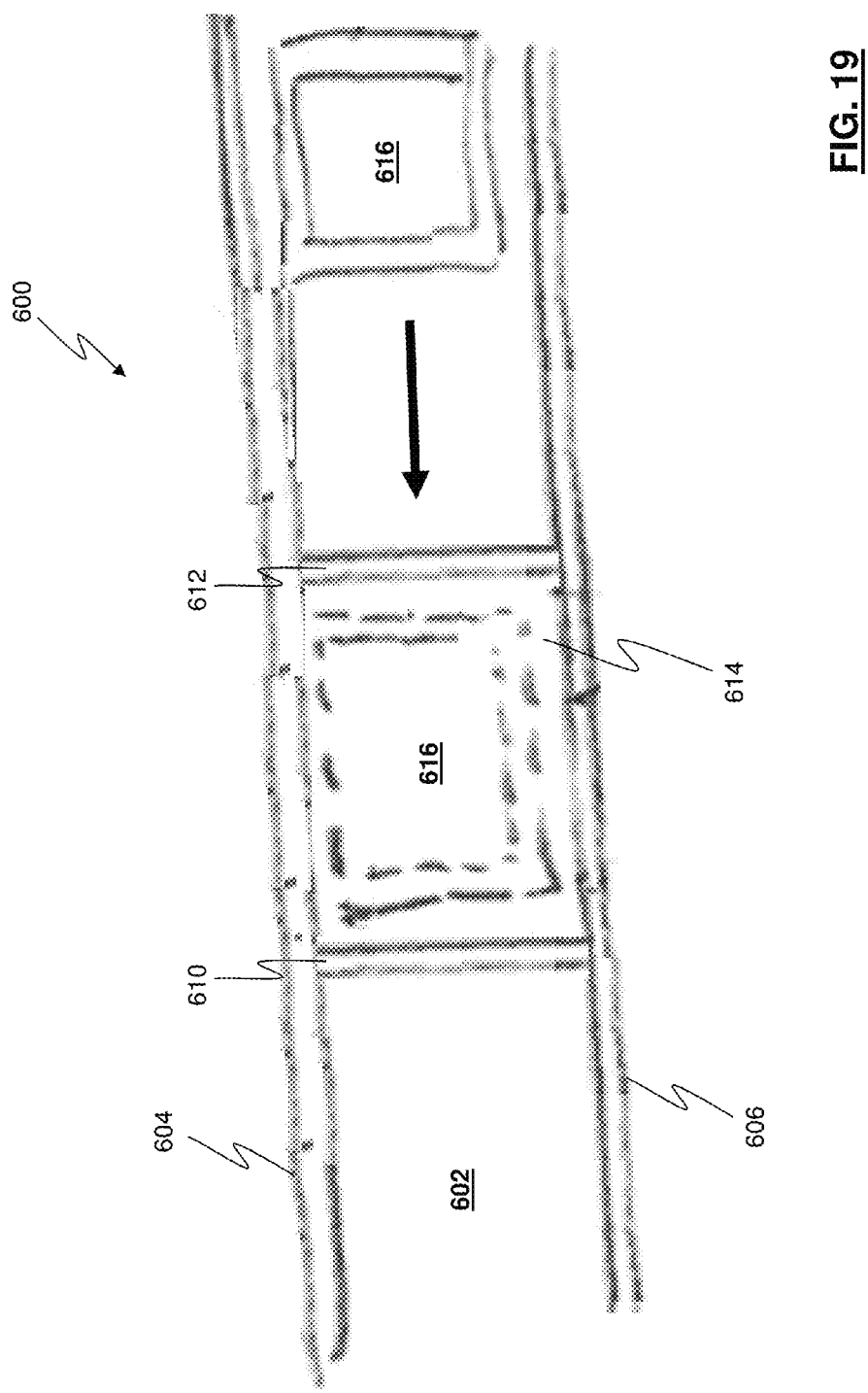
FIG. 19 is top down view of the tank bottom and the vertical support of FIG. 18, being associated with the tank bottom.

Referring to FIG. 18 and FIG. 19, an additional embodiment of the invention is shown. As illustrated, a section of the interior portion of a septic tank 600 is shown and illustrates a sectional view of a channel 602 running transversely (or may be lengthwise) along the bottom (or top) of the septic tank 600 where the channel 602 is formed by opposing vertical sidewalls 604, 606 and a channel base 608. A plurality of compressibly resilient surfaces or latches 610, 612 (it is contemplated that only one of the latches 610, 612 may be compressible if desired) are located along the channel base 608 and forms a 'pocket' 614 (i.e. an area where a brace 616 will be captured and prevented from moving along the channel 602 as discussed below). The first end (not shown) of the vertical brace 616 or strut is located in the pocket or groove (not shown) on the top portion of the tank 600 (also not shown) and the second end 618 of the vertical brace 616 is located within the channel 602. The second end 618 of the brace 616 is rotated (or moved) along the channel 602 toward the pocket 614 such that the brace 616 encounters one of the plurality of latches 610, 612. It should be appreciated that the latch 610, 612 includes a latch flat (or substantially flat) side 613 which defines a wall of the pocket 614.

As the brace 616 is moved along the channel 602, the brace 616 slides along the channel base 608 and forces the latch 610, 612 to compress allowing the brace 616 to pass over the latch 610, 612 and into the pocket 614. The latch 610, 612 then decompresses such that the brace 616 is prevented from moving along the channel 602 and capturing the brace 616 within the pocket 614 and preventing the brace 616 from being removed from the pocket 614. It should be appreciated that the latches 610, 612 are configured so that they only compress when the brace is outside of the pocket 614 and moved toward the pocket 614. For example, in one embodiment as shown in FIG. 17 and FIG. 18, the side 613 of the latches 610, 612 proximate the pocket 614 are flat while the other side of the latches 610, 612 not proximate the pocket 614 are angled or sloped to allow the brace 616 to slide along the latch 610, 612 and gradually compress the latch 610, 612. Thus, as the brace 616 is moved toward the pocket 614, the brace 616 slides along the sloped surface of the latch 610, 612 compressing the latch 610, 612 until the brace 616 passes over the latch 610, 612 (which becomes decompressed) and into the pocket 614 capturing the brace 616 within the pocket 614. When the brace 616 is located in the pocket 614 any attempted movement of the brace 616 along the channel 602 results in the brace 616 encountering the flat surface 613 of the latch 610, 612 preventing the brace 616 from compressing the latch 610, 612 and moving along the channel 602. It should be appreciated that one or more of the plurality of latches 610, 612 may be compressibly resilient to allow the brace 616 to be installed from either side of the pocket 614. It should be appreciated that in another embodiment, an end of the brace 616 may be resilient, such that as the brace 616 is moved along the channel 602, the end of the brace 616 compresses until the brace 616 is located within the pocket 614 where the end of the brace 616 decompresses capturing the brace 616 within the pocket 614 to prevent the brace from moving along the channel 602 in either direction.

Figure 20A:
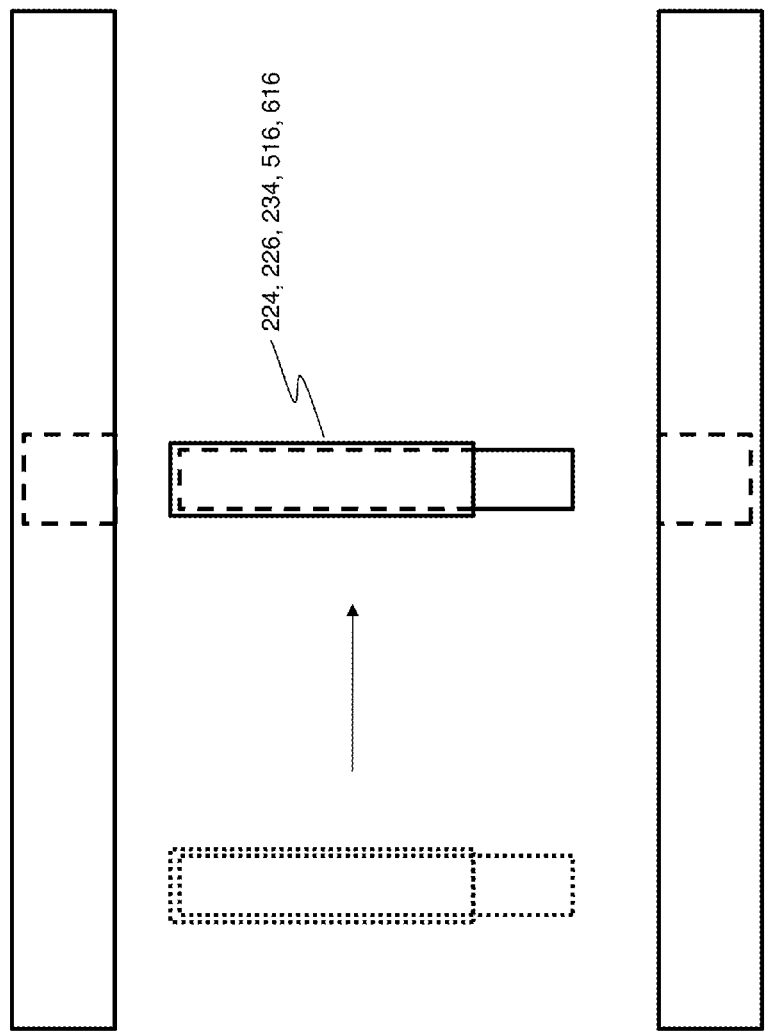
FIG. 20A is a side view of an expandable/retractable internal support/brace in a retracted configuration, in accordance with still yet another embodiment of the invention.

It should be further appreciated that in an additional embodiment, the brace 516, 616 may be expandable/retractable as discussed hereinabove with regards to the internal supports 224, 226, 234 where a dowel or pin 525, 625 may be used to keep the brace 516, 616 expanded. Accordingly, in this case one end of the brace 516, 616 may be located in a top pocket (or bottom pocket) and telescopingly expanded until the other end of the brace 516, 616 is located in the bottom pocket (or top pocket), where a dowel or pin would be used to lock the brace in the expanded configuration (See FIG. 20A and FIG. 20B). Thus, the brace 516, 616 would be prevented by the flat surface 513, 613 of the latches 510, 512, 610, 612 from moving in either direction along the channel 503, 602.

Figure 21:
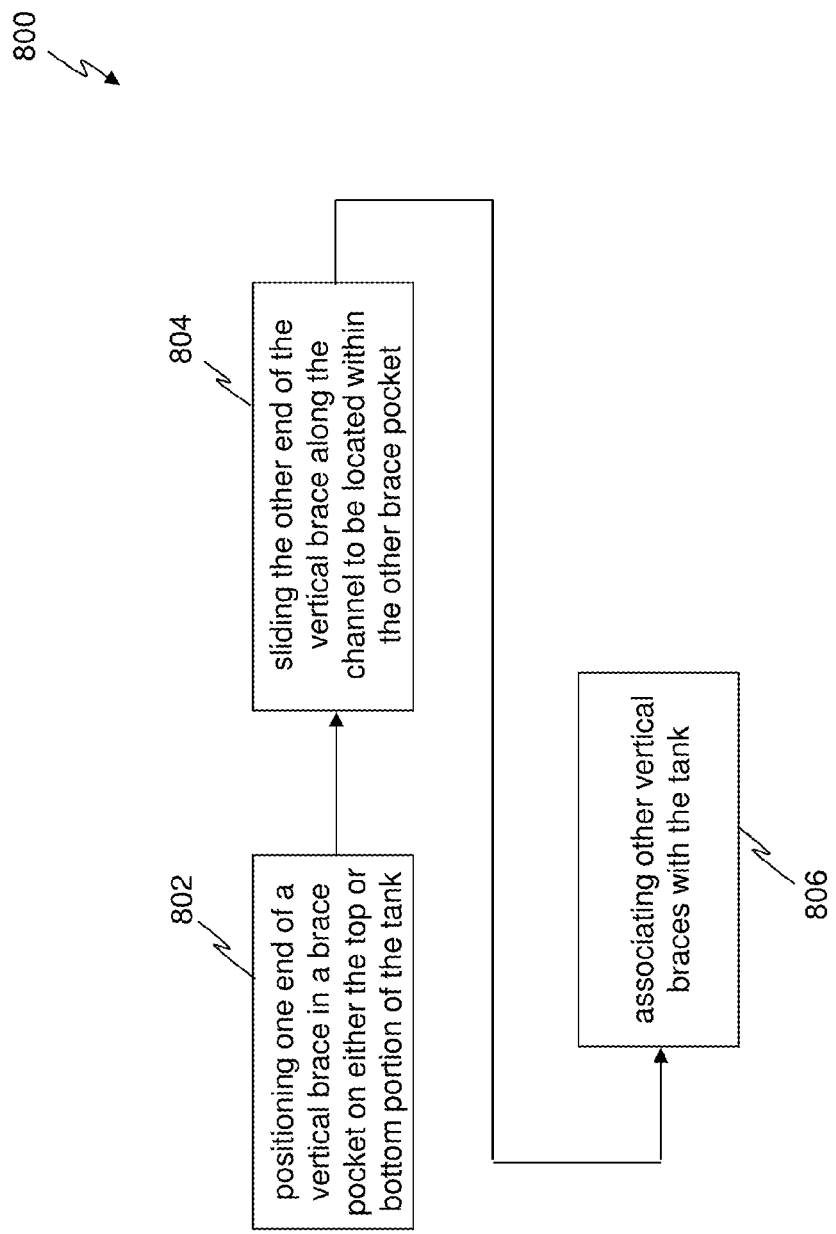
FIG. 21 is an operational block diagram illustrating a method for internally supporting a septic tank using a vertical brace, in accordance with one embodiment of the invention.

In accordance with an additional embodiment of the invention, referring to FIG. 21, an operational block diagram illustrating a method 800 for bracing the top of a septic tank 500, 600 using a vertical brace 516, 616 is provided wherein the septic tank 500, 600 includes a brace pocket 514, 614 within the tank interior to be on an interior surface of the tank bottom and/or the tank top. The method 800 includes positioning one end of the vertical brace 516, 616 in the brace pocket 514, 614 on either the top of the tank 500, 600 or the bottom of the tank 500, 600 such that the other end of the vertical brace 516, 516 is resting within the channel 503, 602, as shown in operational block 802. The end 518, 618 of the vertical brace 516, 616 is then moved (slid) along the channel 503, 602 to be located within the brace pocket 514, 614, as shown in operational block 804. This is accomplished as discussed above by compressing the slope portion of the latches 510, 512, 610, 612, thus causing the latches 510, 512, 610, 612 to compress and allow the vertical brace 516, 616 to slide over (past) the latches 510, 512, 610, 612 and into the brace pocket 514, 614. Additional vertical braces 516, 616 may be installed as described above, as shown in operational block 806.

It should be further appreciated that the function of the plurality of latches 510, 512, 610, 612 may also be accomplished by the natural flex of the plastic material used to construct the channel 502, 602. Moreover, the internal supports 224, 226, 234 and/or braces 516, 616 may be constructed from any material suitable to the desired end purpose, such as a fiberglass, metal, a composite material and/or a thermoplastic material, such as polypropylene or high density polyethylene or non-thermoplastic material. Moreover, the internal supports 224, 226, 234 and/or braces 516, 616 may be sized as desired or for a particularly sized tank. For example, in one embodiment the internal supports 224, 226, 234 and/or braces 516, 616 may be square shaped with a width W of about 1 inch, a depth D of about 1 inch and a length that is dependent of the size of the tank. Additionally, in another embodiment the internal supports 224, 226, 234 and/or braces 516, 616 may be square shaped with a width W of about 2 inches, a depth D of about 2 inches and a length that is dependent of the size of the septic tank. In still yet another embodiment, the internal supports 224, 226, 234 and/or braces 516, 616 may be rectangular shaped with a width W of about 2 inches, a depth D of about 1 inch and a length that is dependent of the size of the septic tank.

Additionally, the septic tank may be made of a thermoplastic such as a polypropylene or high density polyethylene. In generality of the invention, the septic tank may be made a multi-piece construction (i.e. two half tanks) or a single-piece construction and/or by means other than injection molding and they may be made of a non-thermoplastic resin, as well.

While the invention has been described with reference to an exemplary embodiment, it should be understood by those skilled in the art that various changes may be made and equivalents may be substituted for elements thereof without departing from the scope of the invention. Moreover, the embodiments or parts of the embodiments may be combined in whole or in part without departing from the scope of the invention. In addition, many modifications may be made to adapt a particular situation or material to the teachings of the invention without departing from the scope thereof. Therefore, it is intended that the invention not be limited to the particular embodiment disclosed as the best mode contemplated for carrying out this invention, but that the invention will include all embodiments falling within the scope of the appended claims. Moreover, unless specifically stated any use of the terms first, second, etc. do not denote any order or importance, but rather the terms first, second, etc. are used to distinguish one element from another.

We claim:

1. A septic tank, comprising:
  a tank top section having tank top side walls and tank top end walls which define a tank top cavity, wherein the tank top section includes a tank top opening surrounded by a top opening edge and communicated with the tank top cavity,
  a tank bottom section having tank bottom side walls and tank bottom end walls which define a tank bottom cavity, wherein the tank bottom section includes a tank bottom opening surrounded by a bottom opening edge and communicated with the tank bottom cavity, wherein the top opening edge and bottom opening edge are configured to be connected together to form the septic tank such that the tank top cavity is adjacent to the tank bottom cavity to form the tank interior cavity;
  wherein the septic tank includes at least one of,
    at least one end wall pocket located on an interior surface of the tank top end walls and tank bottom end walls;
    at least one side wall pocket located on an interior surface of the tank top side walls and tank bottom side walls; and
    at least one internal support, wherein the internal support is configured to be substantially horizontal relative to the septic tank and includes a first internal support end located within the at least one end wall pocket and a second internal support end located within the at least one side wall pocket; and,
  a top channel structure that defines a top channel on an interior surface of the tank top section, wherein the top channel structure includes a top channel latch that extends into the top channel to define a top brace pocket;
  a bottom channel structure that defines a bottom channel on an interior surface of the tank bottom section, wherein the bottom channel structure includes a bottom channel latch that extends into the bottom channel to define a bottom brace pocket; and
  a supporting brace having a first brace end and a second brace end,
  wherein the first brace end is configured to be located within the top brace pocket and the second brace end is configured to be located within the bottom brace pocket.

2. The septic tank of claim 1, further comprising a gasket seal located between the top opening edge and bottom opening edge to seal the tank interior cavity.

3. The septic tank of claim 1, wherein,
  the tank top side walls include a first top side wall and a second top side wall;
  the tank bottom side walls include a first bottom side wall and a second bottom side wall;
  the at least one end wall pocket includes a first top tank end wall pocket, a second top tank end wall pocket, a first bottom tank end wall pocket and a second bottom tank end wall pocket; and
  the at least one side wall pocket includes a first top tank side wall pocket located on the first top side wall, a second top tank side wall pocket located on the second top side wall, a first bottom tank side wall pocket located on the first bottom side wall and a second bottom tank side wall pocket located on the second bottom side wall.

4. The septic tank of claim 3, wherein the first top tank end wall pocket is aligned with the first top tank side wall pocket, the second top tank end wall pocket is aligned with the second top tank side wall pocket, the first bottom tank end wall pocket is aligned with the first bottom tank side wall pocket and the second bottom tank end wall pocket is aligned with the second bottom tank side wall pocket.

5. The septic tank of claim 3, wherein the first top tank end wall pocket, the first top tank side wall pocket, the second top tank end wall pocket, the second top tank side wall pocket, the first bottom tank end wall pocket, the first bottom tank side wall pocket, the second bottom tank end wall pocket and the second bottom tank side wall pocket are configured to frictionally and securely contain internal support.

6. The septic tank of claim 1, wherein the tank top section and tank bottom section are securely connected to form the septic tank.

7. The septic tank of claim 1, wherein the internal support is configured to limit distortion of the tank to a range of about 0.7% to about 5% when a vacuum of about 3 inches to about 7 inches of Hg is applied to the tank interior cavity.

8. The septic tank of claim 1, wherein the internal support is configured to limit distortion of the tank to about 2% when a vacuum of about 5.8 inches of Hg is applied to the tank interior cavity.

9. The septic tank of claim 1, wherein the septic tank includes a septic tank length and when the at least one internal support is associated with the at least one end wall pocket and the at least one side wall pocket, the at least one internal support is arranged diagonal relative to the septic tank length.

10. The septic tank of claim 1, wherein,
  at least one of the top channel latch and the bottom channel latch is resiliently positionable between a first configuration and a second configuration, wherein
    when in the first configuration, the at least one of the top channel latch and the bottom channel latch are positioned to be at least partially within the top channel and the bottom channel, respectively, and
    when in the second configuration, the at least one of the top channel latch and the bottom channel latch are positioned to be substantially out of the top channel and the bottom channel, respectively.

11. The septic tank of claim 1, wherein, the top brace pocket is aligned with the bottom brace pocket such that when the brace is contained within both the top brace pocket and the bottom brace pocket, brace is substantially vertical.

12. The septic tank of claim 1, wherein,
  when the brace is located within the top brace pocket, the top channel latch retains the brace within the top brace pocket, and
  when the brace is located within the bottom brace pocket, the bottom channel latch retains the brace within the bottom brace pocket.

13. A septic tank, including:
  a tank top, a tank bottom, a plurality of tank side walls and a plurality of tank end walls, wherein the tank top, tank bottom, plurality of tank side walls and plurality of tank end walls define a tank interior cavity;
  at least one end wall pocket located on an interior surface of at least one tank end wall;
  at least one side wall pocket located on an interior surface of at least one tank side wall; and
  at least one supporting member having a first supporting member end located within at least one end wall pocket and a second supporting member end located within at least one side wall pocket, wherein the at least one supporting member is configured to be substantially horizontal relative to the septic tank and strong enough to limit distortion of the tank to a range of about 0.5% to 5% when a vacuum within a range of about 3 to 7 inches of Hg is applied to the tank interior.

14. The septic tank of claim 13, further comprising a gasket seal located between the tank top and tank bottom edge to seal the tank interior cavity.

15. The septic tank of claim 13, wherein,
the plurality of tank side walls include a first top side wall, a second top side wall, a first bottom side wall and a second bottom side wall;
the plurality of tank end walls include a first top end wall, a second top end wall, a first bottom end wall and a second bottom end wall,
the at least one end wall pocket includes a first top tank end wall pocket, a second top tank end wall pocket, a first bottom tank end wall pocket and a second bottom tank end wall pocket; and
the at least one side wall pocket includes a first top tank side wall pocket located on the first top side wall, a second top tank side wall pocket located on the second top side wall, a first bottom tank side wall pocket located on the first bottom side wall and a second bottom tank side wall pocket located on the second bottom side wall.

16. The septic tank of claim 15, wherein the first top tank end wall pocket is aligned with the first top tank side wall pocket, the second top tank end wall pocket is aligned with the second top tank side wall pocket, the first bottom tank end wall pocket is aligned with the first bottom tank side wall pocket and the second bottom tank end wall pocket is aligned with the second bottom tank side wall pocket.

17. The septic tank of claim 13, wherein the internal support is configured to limit distortion of the tank to about 2% when a vacuum of about 5.8 inches of Hg is applied to the tank interior cavity.

18. A tank, including:
a tank top, a tank bottom, and a tank side wall, wherein the tank top, tank bottom and tank side wall define a tank interior;
a top channel structure that defines a top channel on an interior surface of the tank top, wherein the top channel structure includes a top channel latch that defines a top brace pocket;
a bottom channel structure that defines a bottom channel on an interior surface of the tank bottom, wherein the bottom channel structure includes a bottom channel latch that defines a bottom brace pocket; and
a supporting brace having a first brace end and a second brace end, wherein the first brace end is configured to be located within the top brace pocket and the second brace end is configured to be located within the bottom brace pocket.

19. The tank of claim 18, wherein,
at least one of the top channel latch and the bottom channel latch is resiliently positionable between a first configuration and a second configuration, wherein
when in the first configuration, the at least one of the top channel latch and the bottom channel latch are positioned to be at least partially within the top channel and the bottom channel, respectively, and
when in the second configuration, the at least one of the top channel latch and the bottom channel latch are positioned to be substantially out of the top channel and the bottom channel, respectively,
wherein when the brace is located within the top brace pocket, the top channel latch retains the brace within the top brace pocket, and when the brace is located within the bottom brace pocket, the bottom channel latch retains the brace within the bottom brace pocket.

20. The septic tank of claim 19, wherein, the top brace pocket is aligned with the bottom brace pocket such that when the brace is contained within both the top brace pocket and the bottom brace pocket, brace is substantially vertical.

* * * * *